United States Patent [19]

Froehlich et al.

[11] 3,716,368
[45] Feb. 13, 1973

[54] PHOTOGRAPHIC, LIGHT-SENSITIVE MATERIAL CONTAINING A TRISAZO DYESTUFF

[75] Inventors: Alfred Froehlich, Marly-le-Grand; Bernhard Piller, Marly-le-Petit; Hansrolf Loeffel, Berne, all of Switzerland

[73] Assignee: Ciba-Geigy AG, Basle, Switzerland

[22] Filed: Sept. 23, 1970

[21] Appl. No.: 74,860

Related U.S. Application Data

[63] Continuation-in-part of Ser. No. 753,899, Aug. 20, 1968.

[52] U.S. Cl. ...................96/99, 96/20, 96/73, 260/169
[51] Int. Cl. .................................G03c 1/10
[58] Field of Search ..........96/73, 99; 260/169, 173

[56] References Cited

UNITED STATES PATENTS

| 2,286,714 | 6/1942 | Chechak | 96/99 |
| 3,443,953 | 5/1969 | Loeffel | 96/99 |
| 3,542,555 | 11/1970 | Chechak | 96/99 |

*Primary Examiner*—J. Travis Brown
*Attorney*—Harry Goldsmith, Joseph G. Kolodny and Mario A. Monaco

[57] ABSTRACT

Photographic light-sensitive material, especially for the silver dyestuff bleaching process is provided. This material is characterized in that it contains on a support in at least one layer a trisazo dyestuff of the formula

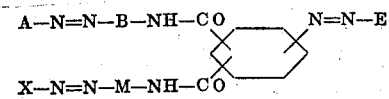

wherein A, K, B and M each represents an aromatic or heterocyclic radical and E represents a radical derived from a coupling component. The dyestuff molecule moreover contains one or more groups conferring solubility in water and also may be present in the form of its metal complex compound. These trisazo dyestuffs absorb in the most diverse wave-length ranges. The trisazo dyestuffs are very fast to diffusion, have high color strength, are readily soluble and compatible with cations.

17 Claims, No Drawings

PHOTOGRAPHIC, LIGHT-SENSITIVE MATERIAL CONTAINING A TRISAZO DYESTUFF

CROSS-REFERENCE

This application is a continuation-in-part of applicant's copending applications Ser. No. 753,899, filed Aug. 20, 1968, the disclosure of which is relied on and incorporated by reference in this application.

The present invention provides trisazo dyestuffs of formula

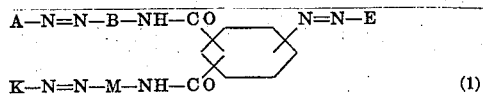

(1)

wherein A, K, B and M each represents an aromatic or heterocyclic residue and E represents a residue derived from a coupling component, wherein the dyestuff molecule contains one or more groups conferring solubility in water, was well as the metal complex compounds of these dyestuffs.

Especially valuable members are the trisazo dyestuffs of formula

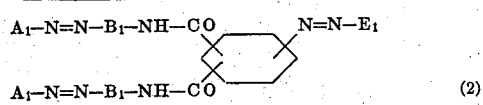

(2)

wherein the residues $A_1$ each represents a benzene, naphthalene or pyrazolone residue, the residues $B_1$ each represents a benzene, diphenyl, naphthalene or pyrazolone residue and $E_1$ represents a benzene residue, naphthalene residue, or heterocyclic, aliphatic or cycloaliphatic residue derived from a coupling component, wherein the residues $A_1-N=N-B_1-$ each contain one to four acid groups which confer solubility in water and $E_1$ may contain one or two acid groups which confer solubility in water, as well as the metal complex compounds of these dyestuffs, especially the copper or nickel complexes. One dyestuff molecule may contain one or two metal atoms in a complex bond between $A_1$ and $B_1$.

Of the trisazo dyestuffs, those of formula

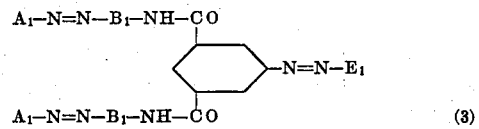

(3)

are especially suitable, wherein $A_1$, $B_1$ and $E_1$ have the meanings given above and wherein the residues $A_1-N=N-B_1$ each contains one to four acid groups which confer solubility in water and $E_1$ optionally contains one to two acid groups which confer solubility in water, as well as the metal complex compounds of these dyestuffs.

Depending on composition, the dyestuffs of formulas (1) to (3) absorb in the most diverse wavelength ranges. Dyestuffs which are yellow as a rule preferably correspond to the formula

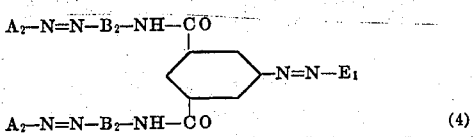

(4)

wherein $A_2$ represents a benzene or naphthalene residue which may be substituted by one or more alkyl groups, alkoxy groups, nitro groups, acylamino groups, halogen atoms and/or one to three sulphonic acid groups, $B_2$ represents a benzene residue which may be substituted by at most two alkyl, alkoxy, hydroxyalkoxy, alkoxy-alkoxy, acylamino, carboxyalkyl, carboxy or phenoxy groups or halogen atoms or a naphthalene residue which may be substituted by an alkyl group and/or at most two sulphonic acid groups, and $E_1$ has the meaning given above.

The residues A, K, $A_1$, $A_2$, B, M, $B_1$ and $B_2$ of formulas (1) to (4) are, for example, derived from the following amines: 2-amino-6-acetylaminonaphthalene-4,8-disulphonic acid, 2-amino-6-benzoylaminonaphthalene-4,8-disulphonic acid, 2-amino-6-(p-toluenesulphonyl)-aminonaphthalene-4,8-disulphonic acid, 2-amino-6-chlornaphthalene-4,8-disulphonic acid, 2-aminonaphthalene-4,8-disulphonic acid, 2-amino-6-nitronaphthalene-4,8-disulphonic acid, 2-aminonaphthalene-5,7-disulphonic acid, 1-amino-naphthalene-3,6-disulphonic acid, 2-aminonaphthalene-4,6,8-trisulphonic acid, 1-aminobenzene-3,5-dicarboxylic acid, 1-aminobenzene-2-sulphonic acid, 1-aminobenzene-2,5-disulphonic acid, aminobenzene, 1-amino-2-methylbenzene or 1-amino-3-methylbenzene, 1-amino-2,5-dimethylbenzene or 1-amino-2,6-dimethylbenzene, 1-amino-2-methoxybenzene or 1-amino-3-methoxy-benzene, 1-amino-2-ethoxybenzene, 1-amino-2-β-hydroxyethoxybenzene, 1-amino-2-β-methoxyethoxy-5-methylbenzene, 1-amino-3-acetylaminobenzene, 1-amino-3-n-butyrylaminobenzene, 1-amino-3-propionylaminobenzene, 1-amino-3-isobutyrylaminobenzene, 1-amino-3-acetylamino-6-methylbenzene, 1-amino-3-propionylamino-6-methylbenzene, 1-amino-3-n-butyrylamino-6-methylbenzene, 1-amino-3-isobutyrylamino-6-methylbenzene, 1-amino-2-acetylamino-5-methylbenzene, 1-amino-2-propionylamino-5-methylbenzene, 1-amino-2-n-butyrylamino-5-methylbenzene, 1-amino-2-isobutyrylamino-5-methylbenzene, 1-amino-2-methoxy-5-methylbenzene, 1-amino-2-methyl-5-methoxybenzene, 1-amino-3-chlorobenzene, 1-amino-2-chloro-5-methoxybenzene, 1-amino-2-methoxy-5-chlorobenzene, 1-amino-3-(3'-carboxypropionylamino)-benzene, 1-amino-2,5-dimethoxybenzene, 1-amino-2,5-diethoxybenzene, 1-amino-2,5-diacetylaminobenzene, 1-amino-naphthalene, 2-amino-naphthalene-7-sulphonic acid, 1-aminobenzene-2-methyl-5-oxyacetic acid, 1-amino-2-methoxy-5-phenoxybenzene and N-3-amino-4-methylphenyl-urea.

The yellow trisazo dyestuffs also include the dyestuffs of formulas (5) and (6):

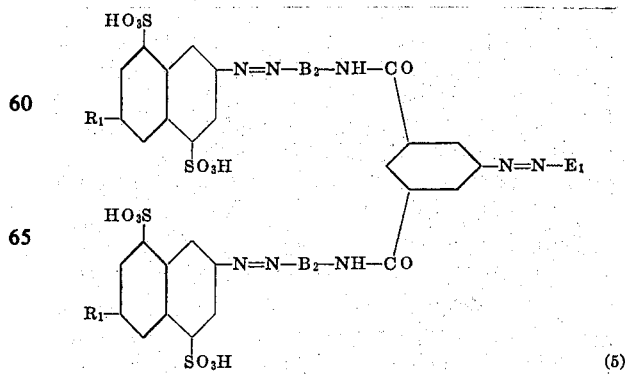

(5)

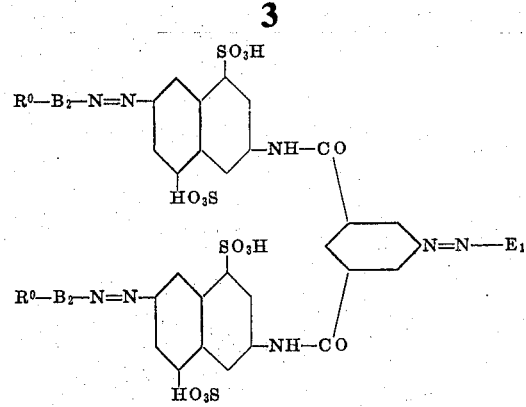

In formulas (5) and (6) $B_2$ and $E_1$ have the meanings given above, $R_1$ represents a hydrogen atom, a nitro group or an acylamino group which is derived from an aliphatic, heterocyclic or aromatic carboxylic acid or from an aliphatic or aromatic sulphonic acid, $R^0$ represents an acylamino group of the composition just mentioned.

The trisazo dyestuffs of formulas (5) and (6) preferably represent dyestuffs corresponding to formulas (7) and (8).

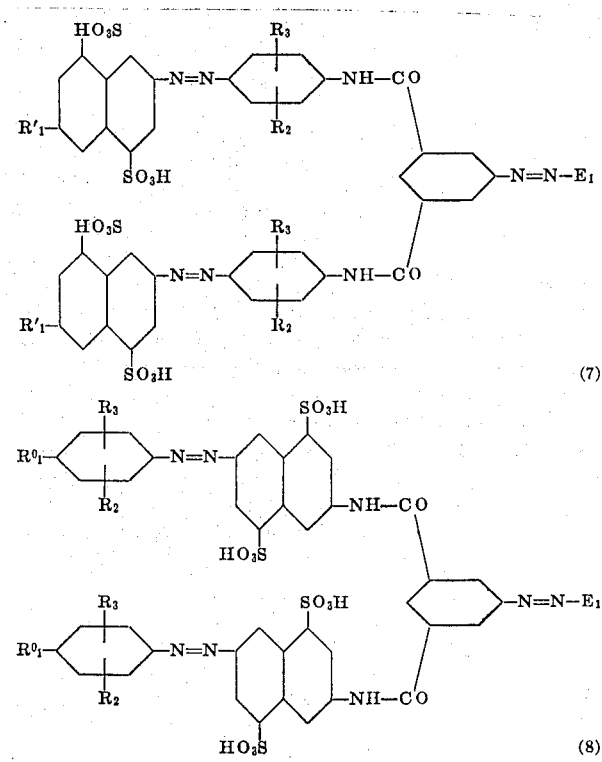

In formulas (7) and (8) $E_1$ has the meaning given above, $R'_1$ represents a hydrogen atom, a nitro group or an acylamino group of formula $D_1-CO-NH-$ or $D_2-SO_2-NH-$ and $R_1^0$ represents an acylamino group of formula $D_1-CO-NYH-$ or $D_2SO_2-NH-$, wherein $D_1$ represents a hydrogen atom, an alkyl, hydroxyalkyl, alkoxy, alkoxyalkyl, carboxyalkyl, sulphonic acid-alkyl, phenylalkyl, vinyl or halogenalkyl residue or an benzene residue, which may be substituted, a furan, a thiophene or a pyridine residue, a primary amino group, an alkylamino group, and a phenylamino group or an alkylaryloxy residue, and $D_2$ represents an alkyl, phenyl, alkylphenyl or halogenophenyl residue, $R_2$ represents a hydrogen atom, a halogen atom, an alkyl, alkoxy, hydroxyalkoxy, or alkoxyalkoxy group each having one to five carbon atoms in the alkyl residue, or a phenoxy, an oxyacetic acid or an acylamino group, with acyl representing the residue of an aliphatic carboxylic acid having one to five carbon atoms or a benzenecarboxylic, pyridinecarboxylic, furancarboxylic or thiophenecarboxylic acid, each of which may be substituted, and $R_3$ represents a hydrogen atom, or an alkyl, alkoxy or acylamino group, with acyl having the meaning given above.

Of especial interest are the yellow trisazo dyestuffs corresponding to formula (9) and (10):

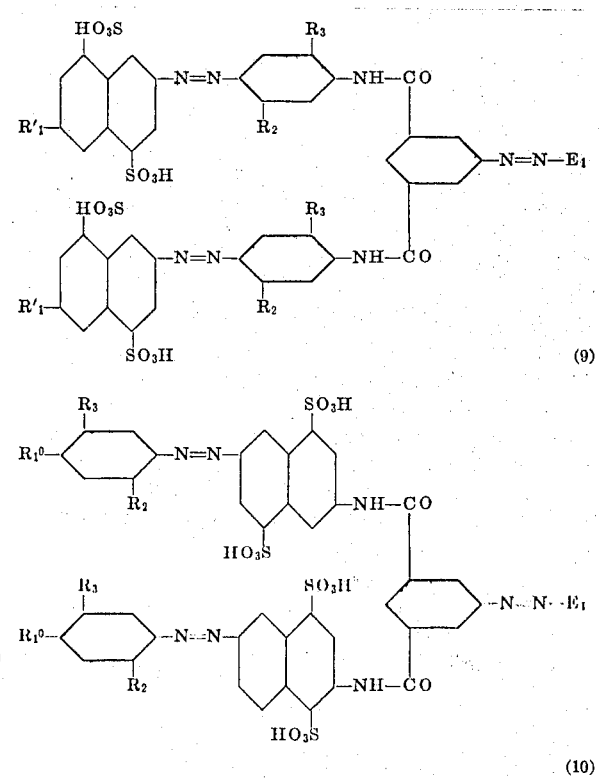

In formulas (9) and (10) $E_1$, $R'_1$, $R^0_1$, $R_2$ and $R_3$ have the meanings given above.

Especially suitable are the dyestuffs of formulas (5) to (10) wherein $R_1$, $R'_1$ and $R^0_1$ each represents hydrogen or an acylamino group such as an acetylaminoe or benzoylamino residue.

The acyl residues $R_1$, $R'_1$ and $R^0_1$ in formulas (5) to (10) are derived from an anhydride and especially from a halide of an acylating component. The following may be, for example, mentioned as halides: acetyl chloride, propionyl chloride, 3-sulphobenzoyl chloride, benzenesulphonyl chloride, p-toluene-sulphonyl chloride, terephthalic acid monomethyl ester-monocarboxylic acid chloride, chloracetyl chloride, 3-chloropropionyl chloride, 2,3-dichloropropionyl chloride, acrylic acid chloride, phenylacetic acid chloride, benzoyl chloride, p-nitrobenzoyl chloride, 4-methylbenzoyl chloride, 3-trifluoromethyl-benzoyl chloride, 4-chlorobenzoyl chloride, 4-methoxybenzoyl chloride, furoyl chloride, thienyl chloride, nicotinic acid chloride, chloroformic acid ethyl ester or chloroformic acid diethylamide. Anhydrides from which the acyl residues are derived are, for example, acetic anhydride or anhydrides of aliphatic carboxylic acids having three to five carbon atoms.

In the yellow trisazo dyestuffs of formula (4) the residue $E_1$ is advantageously represented by the residue $E_2$, which represents a benzene residue, naphthalene residue, heterocyclic residue, especially a pyrazolone residue, or a residue of an acylacetylamino compound, derived from a coupling component, and which may contain one or two acid groups which confer solubility in water. $E_2$ can thus, for example, correspond to one of the formulas (11) to (14):

(11) 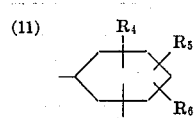   (12) 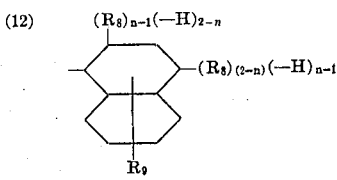

(13) 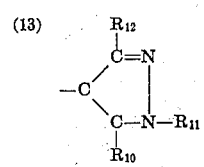   (14) 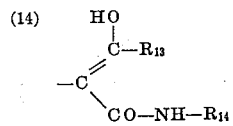

wherein $R_4$ represents a hydroxyl group, an alkoxy group having one to five carbon atoms or an acylamino group which are in the o-position or p-position to the azo group, $R_5$ represents a hydrogen atom, an alkyl or alkoxy group having one to five carbon atoms, a phenyl group, a phenoxy group, a carboxy group, a carbalkoxy group having one to five carbon atoms in the alkyl residue, a carbamide group, a sulphonic acid group or a halogen atom, and $R_6$ and $R_7$ each represents a hydrogen atom or a methyl group; wherein $R_8$ represents a hydroxyl group, an alkoxy group having one to five carbon atoms or an acylamino group, and $R_9$ represents a hydrogen atom or a sulphonic acid group and $n$ is one or two; wherein $R_{10}$ represents a hydroxyl group or a primary amino group, $R_{11}$ represents a phenyl or naphthyl residue which may contain one or more halogen atoms, alkyl, alkoxy or carbalkoxy groups having one to five carbon atoms, phenoxy, carboxy, carbamide, oxyacetic acid and/or sulphonic acid groups and $R_{12}$ represents a hydrogen atom, an alkyl group having one to 17 carbon atoms, an acylamino, phenyl, naphthyl, carboxy or carbamide group, an alkyl-O-CO- or alkyl-O- alkylene-O-CO- group having one to five carbon atoms in each of the alkyl residues or a urea residue, and wherein $R_{13}$ represents an alkyl residue having one to 17 carbon atoms, a phenyl residue which may be substituted by one or more alkyl or alkoxy residues which contain one to five carbon atoms or by one or more halogen atoms, or a pyridyl, furyl or thienyl residue, and $R_{14}$ represents a phenyl or naphthyl residue which may contain one or more alkyl groups having one to five carbon atoms and/or halogen atoms, alkoxy groups having one to five carbon atoms, or carboxy, carbamide or carbalkoxy groups having one to five carbon atoms in the alkyl residue.

The following phenyl residues, for example correspond to formula (11): 4-hydroxyphenyl, 4-methoxyphenyl, 3-methoxy-4-hydroxy-phenyl, 2-methoxy-4-hydroxyphenyl, 3,4-dimethoxyphenyl, 2,3- or 3,5-dimethyl-4-hydroxyphenyl, 3-methyl-4-hydroxyphenyl, 2,3,6-trimethyl-44-hydroxynaphthyl, 4-hydroxy-3-carbethoxyphenyl, 4-hydroxy-P-diphenyl, 2-methoxy-p-diphenyl, 4-methoxy-5-phenoxyphenyl, 4-hydroxy-5-phenoxyphenyl, 3-chlor-4-acetylaminophenyl, 4-acetylaminophenyl, 4-thienylamino-2-methoxyphenyl and 3-methoxy-4-aminophenyl.

2- or 4-Hydroxynaphthyl residues or the residue of 2-hydroxynaphthalene-7-sulphonic acid, for example, correspond to formula (12).

The following pyrazolone residues, for example, correspond to formula (13); 1,3-dimethyl-5-pyrazolone, 1-phenyl-3-methyl-5-pyrazolone, 1,3-diphenyl-5-pyrazolone, 1-phenyl-3-butyl-5-pyrazolone, 1-phenyl-3-(4'-methoxyphenyl)-5-pyrazolone, 1-phenyl-3-(4'-chlorophenyl)-5-pyrazolone, 1-(2'-chlorophenyl)-3-methyl-5-pyrazolone-5'-sulphonic acid, 1-(4'-chlorophenyl)-3-methyl-5-pyrazolone, 1-phenyl-3-acetylamino-5-pyrazolone, 1-phenyl-3-carboxylic acid ethyl ester-5-pyrazolone, 1-phenyl 3-carboxylic acid ethoxyethyl ester-5-pyrazolone, 1-phenyl-3- carboxylic acid methoxyethyl ester-5-pyrazolone, 1-α-naphthyl-3-methyl-5-pyrazolone, 1-α-naphthyl-3-carbethoxy-5-pyrazolone, 1-β-naphthyl-3-methyl-5-pyrazolone-4',8'- or -6', 8'-disulphonic acid, 1-phenyl-3-carboxy-5-carboxy-5-pyrazolone, 1-phenyl-3-acetic acid -5-pyrazolone, 1-phenyl-5-pyrazolone-3-carboxylic acid amide, 1-phenyl-3-methyl-5-pyrazolone-3'-sulphonic acid, 1-phenyl-3-carbethoxy-5-pyrazolone-3'-carboxylic acid ethyl ester, 1-phenyl-3-methyl-5-pyrazolone-3', 5'-dicarboxylic acid dimethyl ester, 1-(4'-phenoxyphenyl)-3-methyl-5-pyrazolone, 1-(3'-methoxyphenyl)-3-carbethoxy-5-pyrazolone, 1-(4'-carbethoxyphenyl)-3-methyl-5-pyrazolone, 3-methyl-5-pyrazolone-1-(4'-phenoxyacetic acid ethyl ester), 3-methyl-5-pyrazolone-1-(4'-phenylsulphonic acid), 3-benzoylamino-1-phenyl-5-pyrazolone, 5-pyrazolone-3-carboxylic acid methyl ester.

In formula (14), $R_{13}$ may, for example, represent a methyl, phenyl, naphthyl, tolyl, anisyl, chlorophenyl, furyl or pyridyl residue and $R_{14}$ a phenyl, chlorophenyl, xylyl, anisyl, α-naphthyl-4-carbamidophenyl, 3,5-dicarboxyphenyl or 3,5-dicarbethoxyphenyl residue. The residues of formula (14) thus, for example, correspond to the residues of formulas (14a) to (14e):

(14a) 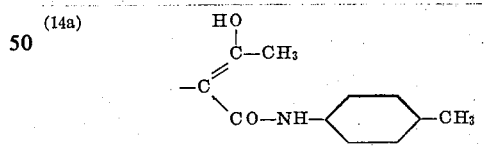

(14b) 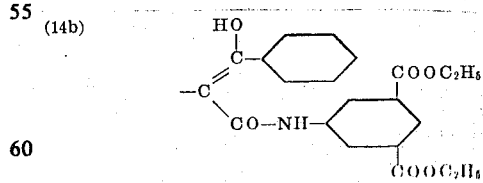

(14c) 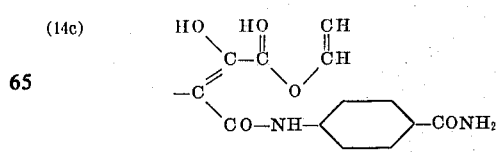

(14d) 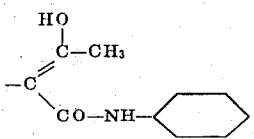

(14e) 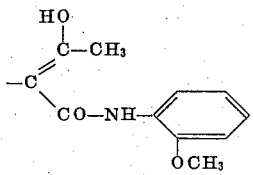

Preferred yellow dyestuffs correspond to the formula

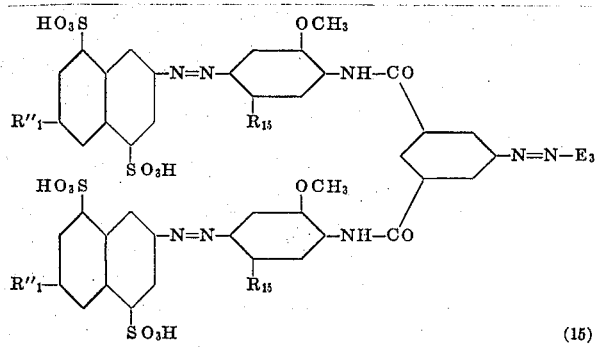

(15)

wherein $R''_1$ represents a hydrogen atom, an acetylamino, benzoyl-amino or tosylamino group, $R_{15}$ represents a chlorine atom, or a methyl, methoxy or acetylamino group, $E_3$ represents a 1-naphthol residue bonded to the azo bridge in the four-position, a residue of formula

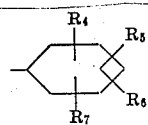

(11)

wherein $R_4$, $R_5$, $R_6$ and $R_7$ have the meanings given above, or a residue of formula

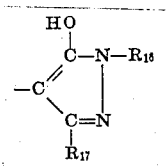

(16)

wherein $R_{16}$ represents a phenyl or naphthyl residue and $R_{17}$ represents a methyl, acylamino, carboxy, carbethoxy, carbethoxyethoxy or carbamide group.

Other preferred yellow dyestuffs correspond to the formula

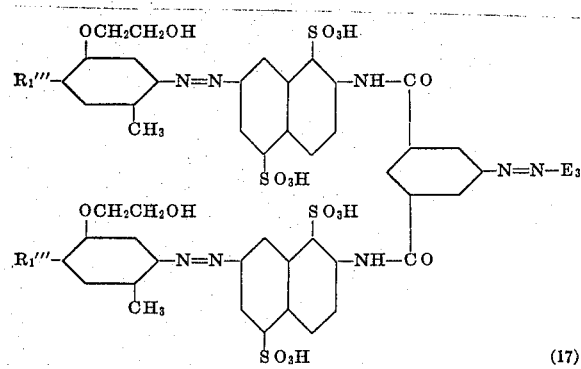

(17)

wherein $E_3$ has the meaning given above and $R'''_1$ represents an acetylamino group.

Dyestuffs which generally yield red or purple color shades correspond to the formula

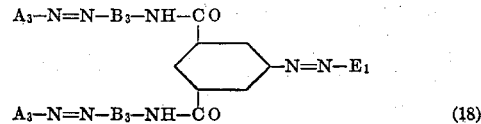

(18)

wherein $A_3$ represents a benzene or pyrazolone residue, but preferably a naphthalene residue, which contains at least one hydroxyl group and/or a residue of formula

(19)

wherein $U_1$ represents a hydrogen atom or an alkyl, phenyl, alkylphenyl, acyl, hydroxyalkyl or cycloalkyl residue and $U_2$ represents a hydrogen atom, or an alkyl or hydroxyalkyl residue, $B_3$ represents a benzene, naphthalene or diphenyl residue which may contain a halogen atom or an alkyl or alkoxy residue, with the residues $A_3$ and $B_3$ together containing one to three sulphonic acid groups, and $E_1$ has the meaning given above, as well as the metal complex compounds, preferably copper complex compounds, of these dyestuffs. As such dyestuffs, there should be mentioned purple dyestuffs of formula

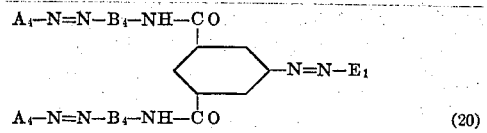

(20)

Wherein $A_4$ represents a naphthalene residue which contains one or two sulphonic acid groups and a hydroxyl group and a residue of formula $-NH-U_3$, wherein $U_3$ represents a hydrogen atom, or an alkyl, phenyl or acyl residue, $B_4$ represents a benzene or diphenyl residue which may contain a chlorine atom, a sulphonic acid group, or an alkyl or alkoxy group each having one to five carbon atoms, and $E_1$ has the meaning given above.

Purple dyestuffs of formula

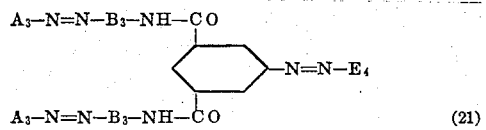

(21)

wherein $A_3$ and $B_3$ have the meaning given above and $E_4$ represents a benzene, pyrazoledione, barbituric acid, acylacetic acid, or cyanacetic acid residue or a residue of a $\beta$-diketone, are also of interest.

Finally, possible purple trisazo dyestuffs are also dyestuffs of formula

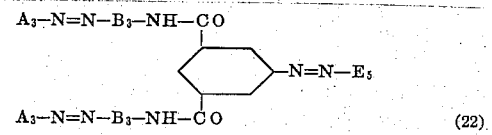

(22)

wherein $A_3$ and $B_3$ have the meanings given above and $E_5$ represents a naphthalene residue which contains one or two sulphonic acid groups and one or two hydroxyl groups and/or a residue of formula $-NH-U_3$, wherein $U_3$ represents a hydrogen atom or an alkyl, phenyl or acyl residue.

The residues A, K, $A_1$, $A_3$ and $A_4$ in the purple dyestuffs of formulas (1), (2), (3), (18), (20), (21) and (22) are, for example, derived from the following azo components: 2-amino-8-hydroxynaphthalene-6-sulphonic acid, 2-(2'-methylphenylamino)-8-hydroxynaphthalene-6-sulphonic acid, 2-(2', 6'-dimethylphenylamino)-8-hydroxynaphthalene-6-sulphonic acid, 2-(2',6'-di-ethylphenylamino)-8-hydroxynaphthalene-6-sulphonic acid, 2-(2'-, 4',6'-trimethylphenylamino)-8-hydroxynaphthalene-6-sulphonic acid, 2-(2',3',4',6'-tetramethylphenylamino)-8-hydroxynaphthalene-6-sulphonic acid, 2-dimethylamino-8-hydroxynaphthalene-6-sulphonic acid, 2-diethylamino-8-hydroxynaphthalene-6-sulphonic acid, 2-β-hydroxyethylamino-8-hydroxynaphthalene-6-sulphonic acid, 2-n-butylamino-8-hydroxynaphthalene-6-sulphonic acid, 2-cyclohexylamino-8-hydroxynaphthalene-6-sulphonic acid, 2-(2',6'-dimethylphenylamino)-8-hydroxynaphthalene-3,6-disulphonic acid, 2-methylamino-8-hydroxynaphthalene-6-sulphonic acid, 2-amino-8-hydroxynaphthalene-3,6- or -5,7-disulphonic acid, 2-amino-8-hydroxynaphthalene-5-sulphonic acid, 2-(di-β-hydroxyethyl)-amino-8-hydroxynaphthalene-6-sulphonic acid, 1-acetylamino-8-hydroxynaphthalene-3,6-disulphonic acid, 1-amino-8-hydroxynaphthalene-2,6-disulphonic acid, 1-amino-8-hydroxynaphthalene-3,6-disulphonic acid, 1-amino-8-hydroxynaphthalene-4,6-disulphonic acid, 1-amino-8-hydroxynaphthalene-2,5-disulphonic acid, 1-amino-8-hydroxynaphthalene-4-sulphonic acid, 2-amino-5-hydroxynaphthalene-7-sulphonic acid, 2-aminonaphthalene-6-sulphonic acid, 2-hydroxynaphthalene-4- or -6- or -7-sulphonic acid, 2-hydroxynaphthalene-3,6- or 6,8-di-sulphonic acid, 1,7-dihydroxynaphthalene-3,6-disulphonic acid and 1,8-dihydroxynaphthalene-3,6-disulphonic acid. Amongst the aminonaphthalenes, the corresponding acyl derivatives can also be used.

The residues B, M, $B_1$, $B_3$ and $B_4$ in the purple dyestuffs of formulas (1), (2), (3), (18), (20), (21) and (22) are, for example, derived from the following diazo components containing nitro groups: 1-amino-4-nitrobenzene-2-sulphonic acid, 1-amino-5-nitrobenzene-2-sulphonic acid, 1-amino-4-nitrobenzene, 1-amino-2-methyl-4-nitrobenzene, 1-amino-2-methoxy-4-nitrobenzene and 1-amino-2-methoxy-4-nitrobenzene and 1-amino-2-chloro-4-nitrobenzene. Instead of these diazo components it is, for example, also possible to use benzidene-3-sulphonic acid.

Especially suitable combinations of $A_3$ and $B_3$, and $A_4$ and $B_4$, respectively are, for example, given by the following residues of formulas $$A_3 - N = N - B_3 - NH - CO -, \quad (23)$$

or $$A_4 - N = N - B_4 - NH - CO - \quad (24)$$

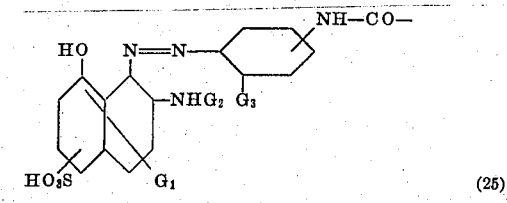

(25)

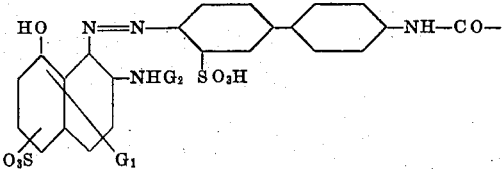

(26)

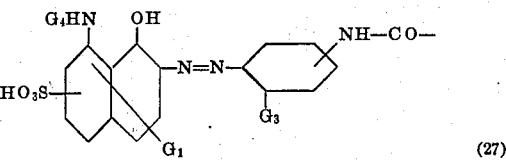

(27)

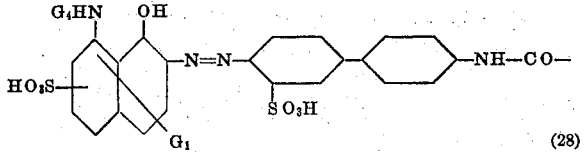

(28)

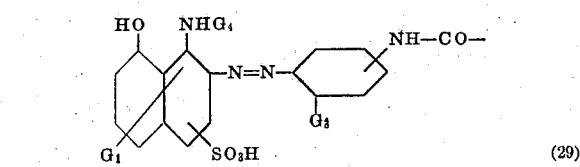

(29)

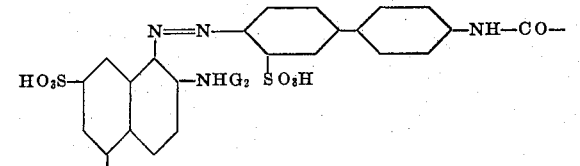

(30)

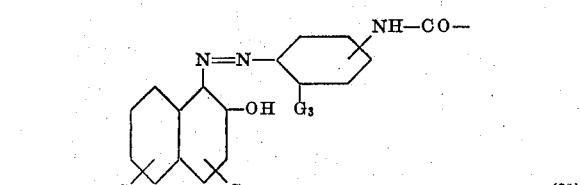

(31)

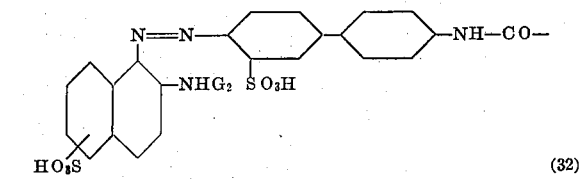

(32)

In formulas (25) to (32) $G_1$ and $G_5$ each represents a hydrogen atom or a formulas: acid group, $G_2$ represents a hydrogen atom or an alkyl or benzene residue, $G_3$ represents a hydrogen atom, a halogen atom, an alkyl residue, an alkoxy residue or a sulphonic acid group and $G_4$ represents a hydrogen atom or an acyl residue.

Other purple dyestuffs of formula (3) contain $A_3-N=N-B_3-NH-CO-$residues corresponding to the following formulae:

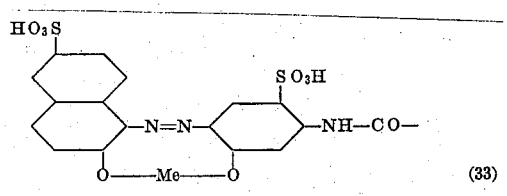

(33)

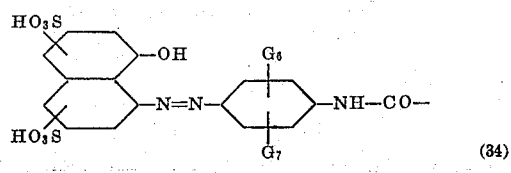

(34)

In formulae (33) and (34) Me represents a copper atom, $G_6$ a hydrogen atom, an alkyl, alkoxy or acylamino residue or a halogen atom and $G_7$ represents a hydrogen atom or an alkyl, alkoxy or acylamino residue.

The residues E, $E_1$, $E_4$ and $E_5$ of the purple dyestuffs may form phenylazo derivatives which in relation to the remaining part of the trisazo dyestuff molecule only absorb slightly, or very slightly, in the visible range of the spectrum or which absorb to the same, or almost the same, extent in the same range and optionally also in another range, of the spectrum.

E-resides yielding a weak color are, for example, to be found amongst the residues of formulas (11), (14), (14a) to (14b). Residues of barbituric acid, of acetoacetic acid ester or of cyanacetic acid ester are also possibilities. Pyrazoledione residues and residues of β-diketones, for example, cyclohexanedione-1,3 also belong to this category.

E-residues, for example $E_5$-residues, which form phenylazo derivatives of similar color and comparable color strength are, for example, derived from the following azo components: 2-amino-8-hydroxynaphthalene-6-sulphonic acid, 2-(2'-methylphenylamino)-8-hydroxynaphthalene-6-sulphonic acid, 2-(2',6'-dimethylphenylamino)-8-hydroxynaphthalene-6-sulphonic acid, 2-(2', 6'-diethylphenylamino)-8-hydroxynaphthalene-6-sulphonic acid, 2-(2',4',6'-trimethylphenylamino)-8-hydroxynaphthalene-6-sulphonic acid, 2-(2',3',4',6'-tetramethylphenylamino)-8-hydroxynaphthalene-6-sulphonic acid, 2-dimethylamino-8-hydroxynaphthalene-6-sulphonic acid, 2-diethylamino-8-hydroxynaphthalene-6-sulphonic acid, 2-β-hydroxyethylamino-8-hydroxynaphthalene-6-sulphonic acid, 2-di-(β-hydroxyethylamino)-8-hydroxynaphthalene-6-sulphonic acid, 2-n-butylamino-8-hydroxynaphthalene-6-sulphonic acid, 2-cyclohexylamino-8-hydroxynaphthalene-6-sulphonic acid, 2-(2',6'-dimethylphenylamino)-8-hydroxynaphthalene-3,6-disulphonic acid, 2-methylamino-8-hydroxynaphthalene-6-sulphonic acid, 2-amino-8-hydroxynaphthalene- 3,6- or -5,7-disulphonic acid, 2-amino-8-hydroxynaphthalene-5-sulphonic acid, 1-amino-8-hydroxynaphthalene-2,6-disulphonic acid, 1-amino-8-hydroxynaphthalene-3,6-disulphonic acid, 1-amino-8-hydroxynaphthalene-4,6-disulphonic acid, 1-amino-8-hydroxynaphthalene-2,5-disulphonic acid, 1-amino-8-hydroxynaphthalene-4-sulphonic acid, 2-amino-6-hydroxynaphthalene-7-sulphonic acid, 1,7-dihydroxynaphthalene-3,6disulphonic acid and 1,8-dihydroxynaphthalene-3,6-disulphonic acid.

Among the aminonaphthalenes, the corresponding acyl derivatives can also be used.

E-residues which form phenylazo derivatives of different color and comparable color strength are, for example, residues of formulas (12) and (13).

Blue or bluish-green dyestuffs of formula (1) preferably correspond to the formula

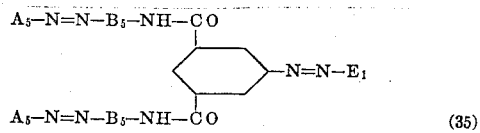

(35)

wherein $A_5$ represents a naphthalene residue which contains one or two sulphonic acid groups, at least one hydroxyl group and a residue of formula —O—$U_4$ or —NH—$U_5$, wherein $U_4$ represents a hydrogen atom or an alkyl or an aralkyl group and $U_5$ represents a hydrogen atom or an alkyl, hydroxyalkyl, phenyl or acyl residue, $B_5$ represents a benzene residue which contains at least one alkyl alkoxy or acylamino residue or a naphthalene residue which contains one or two sulphonic acid residues and a hydroxyl group, and $E_1$ has the meaning given above, as well as the metal complex compounds preferably copper complex compounds, of these dyestuffs.

Bluish-green dyestuffs corresponding to the formula

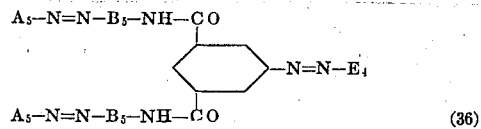

(36)

wherein $A_5$, $B_5$ and $E_4$ have the meanings given above, are especially advantageous.

The residues A, K, $A_1$ and $A_5$ of the bluish-green dyestuffs of formulas (1), (2), (3), (35) and (36) are, for example, derived from 1-amino-8-hydroxynaphthalene-2,4- or -3,6- or -4,6-disulphonic acid.

The amino group in the 1-position can be a primary amino group or, especially in the case of the -3,6- and of the -4,6-disulphonic acid, also an amino group which is further substituted, for example a monoalkylamino or dialkylamino group, for example, a momomethylamino or dimethylamino, monoethylamino or diethylamino group, a ω-hydroxyalkylamino group, for example, a β-hydroxyethylamino group, a phenylamino group or especially an acylamino group, for example, an acetylamino or propionylamino group. As acylamino groups there should especially be mentioned those which contain a benzene nucleus which may be further substituted, for example benzoylamino, dichlorobenzoylamino and p-toluenesulphonylamino groups.

Furthermore the A- and K-residues of the bluish-green dyestuffs may, for example, also be derived from the following components: 1,8-dihydroxy-naphthalene-3,6-disulphonic acid, 1-hydroxy- 8-methoxynaphthalene-3,6disulphonic acid, 1-hydroxy-8-benzyloxy-naphthalene-3,6-disulphonic acid, 2-amino-8-hydroxy-naphthalene-6-sulphonic acid, 2-amino-8-hydroxy naphthalene-3,6-disulphonic acid and 2-acetylamino-5-hydroxy-naphthalene-4,8-disulphonic acid.

In the case of bluish-green dyestuffs the residues B, M, $B_1$ and $B_5$ are, for example, derived from the following components: 1-amino-2-methoxy-5-methyl-4-nitrobenzene, 1-amino-2,5-dimethoxy-4-nitrobenzene, 1-amino-2,5-diethoxy-4-nitrobenzene, 1-amino-2,5-dimethoxy-4-acetylaminobenzene, 1-amino-2-methoxy-4-acetylamino-5-phenoxybenzene as well as 2-nitro-6-amino-naphthalene-4,8-disulphonic acid.

In the case of bluish-green dyestuffs of formulas (1) to (3) and (35) and (36) it can be advantageous to choose the residue E, $E_1$ or $E_4$ derived from a coupling component, and optionally so to modify it, so that the phenylazo compound produced therefrom no longer substantially absorbs in the visible region of the spectrum. Such E-residues are preferably derived from the aliphatic or cycloaliphatic series. Possible starting materials for the E-residues are for example: derivatives of acetoacetic ester and of cyanacetic ester and similar β-diketones, cyclohexanedione-1,3, barbituric acid and pyrazolediones, but also phenols, the hydroxyl group of which is subsequently alkylated, or anilines, the amino group of which is subsequently acylated. Suitable combinations of $A_5$ with $B_5$, for example, lead to the following residues of formula $A_5$—N=N—$B_5$—NH—CO—, which may occur in the bluish-green dyestuffs:

[Structure (37)]

[Structure (38)]

[Structure (39)]

In formulas (37) to (39) $G_1$ represents a hydrogen atom or a sulphonic acid group, $G_{12}$ and $G_{13}$ each represents a hydrogen atom or an alkyl residue or $G_{12}$ represents a hydrogen atom and $G_{13}$ an aryl or acyl residue, $G_{14}$ an alkyl residue, $G_{15}$ a hydrogen atom or an alkyl or aralkyl residue, $G_{16}$ a hydrogen atom or an alkyl or alkoxy residue and Me a nickel atom or especially a copper atom.

In all the present dyestuffs any occurring alkyl radicals with a few exceptions in the E radicals are lower alkyl radicals containing one to five, preferably one or two carbon atoms. Halogen as substituent is fluorine, iodine, especially bromine or above all chlorine.

The yellow, purple and bluish-green dyestuffs of formula (1) are all manufactured according to the same processes. The present invention thus provides a process for preparing these dyestuffs which comprises condensing a compound of the formula $$A-N=N-B-NH_2 \quad (40a)$$

and/or $$K-N=N-M-NH_2 \quad (40b)$$

wherein A, B, K and M have the meanings give above, with a dicarboxylic acid dihalide of formula

[Structure with X—OC and N=N—E]

wherein X represents a halogen atom and E has the meaning given above, and optionally converting the dyestuff obtained into a metal complex compound.

The condensation is effected according to methods known per se and is advantageously carried out in a polar solvent, for example, water or especially a polar organic solvent, for example, dimethylformamide, diethylacetamide or N-methylpyrrolidone. It is also advantageous to carry out the condensation in the presence of an acid-binding agent, for example, a tertiary amine or an alkali metal carbonate. It is also possible to carry out the condensation in a solvent which itself acts as an acid-binding agent, for example, pyridine, or the N-methylpyrrolidone which has been mentioned previously.

The conversion to a metal complex compound takes place according to methods known per se for example, in a bath containing copper sulphate.

The manufacture of the aminoazo dyestuffs of formulas (40a) and (40b) takes place according to methods known per se, for example, by combining a diazo compound of an amine of formula $$A - NH_2 \quad (42a)$$

or $$K - NH_2, \quad (42b)$$

wherein A and K have the meanings given above, advantageously in an acid medium, with a monoamine capable of coupling, of formula $$H - b - NH_2 \quad (43a)$$

or $$H - M - N_2 \quad (43b)$$

wherein B and M have the meanings given above. Another method, for example, comprises coupling a diazo compound of a nitro compound of formula $$H - B - NO_2 \quad (44a)$$

or $$H - M - NO_2 \quad (44b)$$

with compounds of formula $$H - A - NH_2 \quad (45a)$$

or $$H - K - NH_2, \quad (45b)$$

wherein B, M, A and K have the meanings given above, in an acid medium and reducing the nitro group in the nitroazo dyestuff thus obtained to the amino group.

The manufacture of the dicarboxylic acid dihalides of formula (41) is carried out by diazotising, and coupling an aminobenzene dicarboxylic acid or its ester to a compound of formula H—E, wherein E has the meaning given above, and optionally alkylating or acylating a hydroxyl or amino group in the o-position or p-position in the residue E and reacting the azobenzenedicarboxylic acid thus obtained with, for example, phosphorus pentachloride, phosphorus trichloride or phosgene, optionally in the presence of an inert solvent and optionally with the addition of, for example, pyridine or dimethylformamide as a catalyst.

Another process for the manufacture of trisazo dyestuffs of formula (1) comprises coupling a diazonium compound of an amine of formula

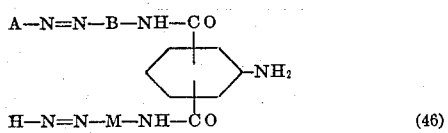

(46)

wherein A, K, B and M have the meanings given above, with a compound of formula $$H - E \quad (47)$$

wherein E has the meaning given above, and optionally converting the dyestuff thus obtained into a metal complex compound.

The diazonium compounds of the amines of formula (46) can be obtained in various ways. Either a dicarboxylic acid dihalide of formula

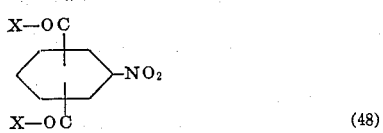

(48)

wherein X has the meaning give above is condensed with a compound of formula (40a) and/or (40b), the nitro group reduced to the amino group and diazotised, or a dicarboxylic acid dihalide of formula

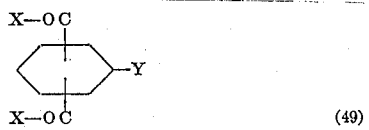

(49)

wherein X has the meaning given above and Y represents the residue —NH—Z or —N=Z, wherein Z represents a protective group which can be split off, is condensed with a compound of formula (40a) and/or (40b), the protective group split off and the compound diazotised. Suitable protective groups are for example, phthaloyl, carbalkoxy, carbophenyloxy, carbobenzoxy or triphenylmethyl groups.

The compounds of formula (49) are advantageously manufactured by reacting a derivative of an aminodicarboxylic acid with a dicarboxylic acid anhydride or a reactive halogen compound of a protective group in an aqueous-alkaline medium or in an inert solvent, optionally in the presence of a compound which add hydrogen halide, for example, pyridine or triethylamine. After saponification and conversion into the dicarboxylic acid dihalide, preferably the dichloride or dibromide, the reaction with the aminoazo dyestuff of formula (40a) and/or (40b) is then effected in the usual manner. The manufacture of products having protective groups and the splitting-off of the protective groups under splitting-off conditions specific to them are known from protein chemistry.

As examples of compounds from which the benzene dicarboxylic acids and their derivatives are derived there may, for example, be mentioned: 3-nitrophthalic acid dichloride, 4-nitrophthalic acid dichloride, 2-nitroterephthalic acid dichloride and preferably 5-nitroisophthalic acid dichloride. Using this manufacturing process, three azo dyestuff systems which may optionally be different from one another can be combined with one another in one molecule in a simple manner.

The trisazo dyestuffs of formula (1) may be used for various purposes, for example, in photographic materials, and when used in these are especially advantageously as image dyestuffs for the silver dyestuff bleaching process. Accordingly, valuable photographic materials can be manufactured in the usual manner known per se, which contains, on a support, at least one layer having a dyestuff of formula (1).

In particular, the trisazo dyestuffs may be present in a multi-layer material which contains, on a layer support, a layer dyed with a greenish-blue dyestuff which is selectively sensitive to red, on top of this a layer dyed purple which is selectively sensitive to green, and finally a layer dyed yellow which is selectively sensitive to blue.

Trisazo dyestuffs of formula (1) may be used in these materials in only one, or in two, or in all three layers. Dyestuffs of formulas (1) to 3) can be employed in all three layers, whilst dyestuffs of formulas (35) and (36) are only suitable for the layer which is sensitive to red, dyestuffs of formulas (18) and (20) to (22) are only suitable for the layer which is sensitive to green and dyestuffs of formulas (4) to (10), (15) and (17) are only suitable for the layer which is sensitive to blue.

It is however also possible to incorporate the dyestuffs of formula (1) in an auxiliary layer or especially in a layer adjacent to the light-sensitive layer.

The dyestuffs of formula (1) are very fast to diffusion in the usual layers. They do not tend to change into an opalescent to turbid form in the gelatine layers on drying and storage, and they can be successfully reduced to harmless and/or easily washed-out decomposition products in a bleaching bath.

The dyestuffs of formula (1) are distinguished by high color strength and purity of the color shades. Using them, for example, combining a yellow dyestuff of formula (7) with a suitable purple dyestuff and a suitable greenish-blue dyestuff, it is possible to produce grey shades which appear neutral to the eye over the whole density range.

Compared to other trisazo dyestuffs, the dyestuffs of formula (1) are especially distinguished by their good solubility and compatibility with cations, especially calcium ions.

In many cases it is especially difficult to displace the absorption of yellow, magenta and cyano dyestuffs by small amounts — for example, by 5 to 15 nm towards longer wavelengths—or somewhat to flatten an excessively steep side of the absorption curve — especially towards longer wavelengths — as can under certain circumstances be desirable for the production of a neutral grey shade, on appropriate combination of all three dyestuffs, over all density ranges.

The new dyestuffs, as a result of a simple combination of two existing chromophoric and auxochromic systems derived from 2-aminoazo dyestuffs with a third system which is largely independent thereof, offer the possibility of effecting such changes in the absorption characteristic by deliberate measures in a single dyestuff molecule. In such a case the coupling component on which the residue E is based must be so chosen that the azo dyestuff of formula

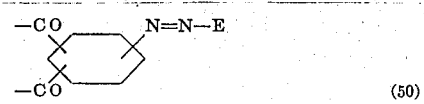

(50)

deviates, in its spectral absorption, by the requisite amount from the spectral absorption of the azo dyestuff residues of formula

$$A{-}N{=}N{-}B{-}NH{-} \quad (51a)$$

and

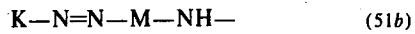
$$K{-}N{=}N{-}M{-}NH{-} \quad (51b)$$

This can be especially desirable if the material containing these dyestuffs is to be used to simulate an original, as can, for example, be the case in the manufacture of component images in the printing industry.

Thus, for example, a luminous red dyestuff can be produced by combination of a yellow dyestuff of the one kind with two intrinsically more bluish-tinged red dyestuffs of the other kind in one molecule, as is achieved in the dyestuff of formula XXXIII. On the other hand an orange dyestuff of formula XXIX can be produced by combination of a red dyestuff with two yellow dyestuffs in one molecule.

The new trisazo dyestuffs, however, differ essentially from the dyestuffs which have hitherto been usual in the silver color bleaching process.

If one attempts to manufacture disazo dyestuffs of formula

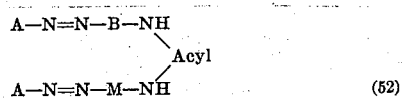
$$\begin{array}{c} A{-}N{=}N{-}B{-}NH \\ \phantom{A{-}N{=}N{-}B{-}N}\diagdown \\ \phantom{A{-}N{=}N{-}B{-}NH}Acyl \\ \phantom{A{-}N{=}N{-}B{-}N}\diagup \\ A{-}N{=}N{-}M{-}NH \end{array} \quad (52)$$

of which the most important absorption lies in a wavelength range of from 400 to 450 nm, 500 to 550 nm and 600 to 650 nm, and which are suitable for the silver color bleaching process, by acylation of suitable aminoazo dyestuffs of formula $$A{-}N{=}N{-}B{-}NH_2 \quad (40a)$$

or $$K{-}N{=}N{-}M{-}NH_2 \quad (40b)$$

with bifunctional acylating components, for example, phosgene, or isophthalic and terephthalic acid dichloride, then yellow, purple and bluish-green dyestuffs are obtained which either do not attain the desired resistance to diffusion — with adequate solubility — or which, whilst losing their color during the bleaching process, with decomposition into the corresponding amino compounds, yield fragments which can, however, not be sufficiently effectively washed out. The image white produced in the totally bleached areas are in such a case not a pure white. The remaining fragments can furthermore lead to discolorations on prolonged exposure to light or moisture.

If, however, the same aminoazo dyestuffs of formula

$$A{-}N{=}N{-}BNH_2 \quad (40a)$$

and

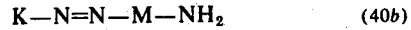
$$K{-}N{=}N{-}M{-}NH_2 \quad (40b)$$

which on acylation lead to yellow, purple or bluish-green dyestuffs are used, and are linked via a bifunctional acylating component which furthermore carries an azo compound, which can be split into two amino compounds under the bleaching conditions, as a further substituent, then the requisite increase in size of the molecule for attaining resistance to diffusion is achieved, and nevertheless ammonium compounds which can easily be washed out are obtained after the bleaching process.

Combinations which have hitherto been given little attention, including also those with metal complexes, can in the following manner be employed as full-value image dyestuffs for the silver color bleaching process:

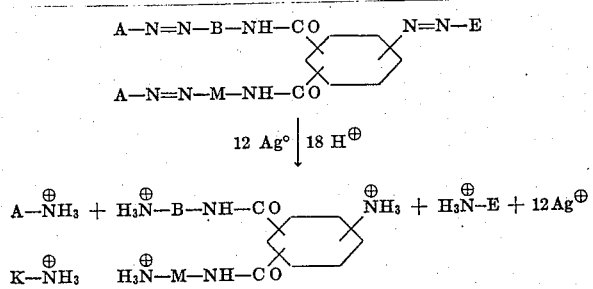

The following examples illustrate the invention: the parts denote parts by weight and the percentages denote percentages by weight.

The formulas I to XLVI of Examples 1 to 29 are listed in Table I together with the wavelengths of the absorption maxima.

EXAMPLE 1

1-Aminobenzene-3,5-dicarboxylic acid is diazotised in the usual manner, coupled on to phenol, and the dyestuff is crystallized from glacial acetic acid. 17.4 g of this dyestuff are dissolved in 35 ml of 10N potassium hydroxide solution and mixed with 30 g of dimethyl sulphate at 100° C. The mixture is kept for ½ an hour at 100° C, cooled to 20° C, diluted to 500 ml with water, filtered, and the product washed with 2N sodium carbonate solution, then with water, and dried at 60° C in vacuo.

Yield: 17.4 g of dyestuff.

4.2 g of this product are boiled with 100 ml of water and 6 ml of 10N sodium hydroxide solution until completely dissolved, filtered, rendered acid to Congo Red by means of hydrochloric acid, and the product filtered off, washed with water and dried in vacuo at 60° C. 3.1 g of p-methoxyphenyl-azo-3,5-benzene-dicarboxylic acid are obtained. 10 g thereof are suspended in 54 ml of benzene and heated to boiling with 9 g of phosphorus pentachloride, whereupon all the material dissolves. The solution is cooled to 20° C, mixed with an equal volume of petroleum ether, cooled in ice, and the product filtered off and washed with petroleum ether. Melting point after recrystallization from benzene and charcoal: 120° to 122° C.

Yield: 8.4 g of p-methoxyphenyl-azo-3,5-benzenedicarboxylic acid dichloride.

13 g of 2-(4'-amino-5'-methoxy-2'-methyl-phenyl)-azo-naphthalene-4,8-disulphonic acid are dissolved in 100 ml of methylpyrrolidone, mixed with 5 ml of pyridine, and 6.5 g of the acid dichloride are added at 15° C. The temperature rises to 25°–30° C. The mixture is stirred for 1 hour at 20° C, 500 ml of acetone are then added, and the product is filtered off and washed with acetone and the residue boiled with 60 ml of acetone, filtered, washed with alcohol and dried. For further purification, 2 g of the dyestuff are dissolved in 20 ml of water, the solution is filtered, and the mother liquor mixed with a solution of 1 g of potassium acetate in 10 ml of methanol. On cooling 1.6 g of the tetrapotassium salt of the dyestuff of formula I crystallize out.

The dyestuffs of formulas II and III are manufactured in an analogous manner.

EXAMPLE 2

1-Aminobenzene-3,5-dicarboxylic acid is diazotised in the usual manner, coupled on to phenol, and the dyestuff recrystallized from glacial acetic acid.

5.5 g of the dyestuff are dissolved in 40 ml of dimethylformamide and 3.4 ml of thionyl chloride are added. The mixture is stirred for 2 hours at 20° C and heated for 1 hour at 30° C water bath temperature and in a vacuum of 16 to 20 mm Hg, with air being drawn through. The acid dichloride is not isolated. 6 g of 2-(4'-amino-5'-methoxy-2'-methylphenyl)-azo-naphthalene-4,8-disulphonic acid are dissolved in 50 ml of methylpyrrolidone and 10 ml of pyridine and the solution of the acid chloride manufactured above is slowly added at 100° C, whilst stirring, until a sample of the reaction mixture no longer shows any amino compound on diazotisation and coupling with β-naphthol (spot test). The reaction solution is mixed with 200 ml of acetone and 50 ml of a 20 percent strength solution of potassium acetate in methyl alcohol, and the product filtered off and washed with acetone. The residue is boiled with 50 ml of methanol, filtered hot and washed with methanol. 5.4 g of the potassium salt of the dyestuff of formula IV are obtained.

The dyestuffs of formulas V to VIII are manufactured in an analogous manner.

EXAMPLE 3

1-Aminobenzene-3,5-dicarboxylic acid is diazotised in the usual manner and coupled on to 1-phenyl-3-methyl-5-pyrazolone. 1.2 g of this dyestuff are boiled with 2 g of phosphorus pentachloride in 20 ml of benzene for ½ hour, the solution is filtered and cooled, and the product is filtered off, and washed with a little benzene and petroleum ether. After recrystallization from benzene 0.9 g of the acid dichloride of melting point 189° C are obtained.

2.5 g of 2-(4'-amino-5'-methoxy-2'-methylphenyl)-azo-naphthalene-4,8-disulphonic acid are dissolved in 40 ml of methylpyrrolidone and 2 ml of pyridine and 1.1 g of the dichloride are introduced at 110° C. The addition of the dichloride is continued until the spot test no longer shows any amine. The reaction solution is then introduced into 150 ml of acetone, and the product filtered off and washed with acetone. The residue is boiled three times with 50 ml at a time of a 1 percent strength solution of potassium acetate in methyl alcohol. Yield: 1.2 g of the potassium salt of the dyestuff of formula IX.

The dyestuff of formula XXIII is manufactured in an analogous manner.

EXAMPLE 4

The dyestuff of formula IX according to Example 3 can also be manufactured according to another method, via the nitro compound of the diazo dyestuff:

45.1 g of the aminomonoazo dyestuff of formula (a) 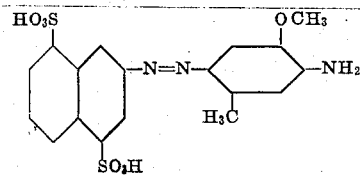

obtained in the usual manner by diazotisation of 2-aminonaphthalene-4,8-disulphonic acid and coupling on to 2-methoxy-5-methylaniline are dissolved in 500 ml of water with addition of the requisite amount of sodium carbonate, 15 g of crystalline sodium acetate are added, and the solution is treated at 25°± 2° C and a pH-value of 9.0 to 9.4 with a solution of 13 g of 5-nitroisophthaloyl chloride in 50 ml of acetone.

The reaction is followed by thin layer chromatography and the addition of the acid chloride repeated two more times at intervals of 4 hours. After completion of the reaction the reaction mixture is warmed to 65° C, 10 g of sodium carbonate are added, and the product is filtered off at 40° C and thoroughly washed with ethanol and acetone.

The disazo dyestuff of formula (b) 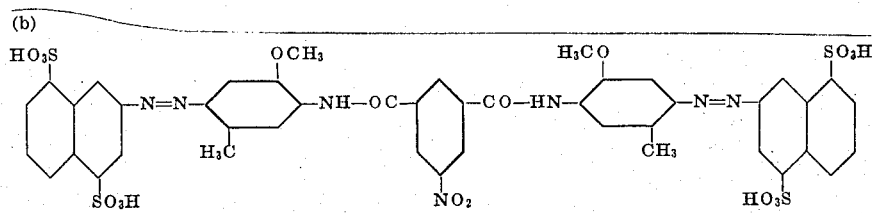

is obtained in 80 to 90 percent yield in the form of an orange-yellow powder.

5.4 g of the disazo dyestuff are suspended in 50 ml of water, 0.05 g of ferric chloride are added at 40° C and a pH-value of 8, as is a solution of 1.85 g of $Na_2S$–9 $H_2O$ in 5 ml of water over the course of 5 minutes, and the mixture is stirred for 2 hours at 40° C. The addition of sodium sulphide is repeated until the nitro group has been completely reduced.

The reaction product is filtered off at room temperature and thoroughly washed with water, acetone and ethanol. For further purification, the filtered residue is dissolved in 150 ml of water, stirred for one hour at 60°

C with addition of a little kieselgur, and precipitated with potassium acetate.

3.4 to 3.7 g of dyestuff of formula (c)
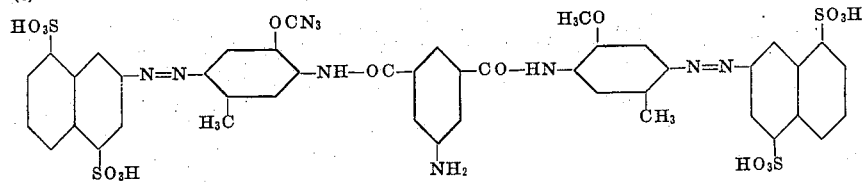

are obtained in the form of an orange-yellow powder.

10.5 g of this dyestuff are suspended in 250 ml of water at a pH-value of 7, 3 ml of 4N sodium nitrite solution are added at 5° C followed by 35 percent strength hydrochloric acid until the mixture reacts acid to Congo Red, the excess nitrite is destroyed in the usual manner after one hour, and sufficient potassium acetate is then added for the Congo Red paper only to retain a pale violet color.

The diazo solution thus obtained is introduced at 5° C into a solution of 2 g of 1-phenyl-3-methyl-5-pyrazolone in 30 ml of water which is buffered with potassium acetate and adjusted to a pH-value of 6. The mixture is stirred for 12 hours at room temperature and the precipitated product is filtered off, washed with water and ethanol and dried in vacuum at 60° C.

The potassium salt of the dyestuff of formula IX is obtained in almost quantitative yield in the form of a dark powder.

EXAMPLE 5

The dyestuff of formula IX according to Examples 3 and 4 can also be manufactured according to a third method, using a protective group:

45.3 g of 5-aminoisophthalic acid are dissolved in 100 ml of water at a pH-value of 9.0, chloroformic acid ethyl ester are added dropwise at 0° C and pH 9.0 until the reaction is complete (45 to 50 ml), the mixture is acidified with 35 percent strength hydrochloric acid and the precipitated product is filtered off, washed with water and dried in vacuo at 60° C. 58.5 g (92 percent) of N-carbethoxy-5-aminoisophthalic acid are obtained in the form of a white powder. Elementary analysis:

Calculated: C 52.17, H 4.38, N 5.53; Found: C 51.94, H 4.21, N 5.88.

5.1 g of N-carbethoxy-5-aminoisophthalic acid are suspended in 35 ml of anhydrous chlorobenzene and 4.4 ml of thionyl chloride and 0.05 ml of pyridine are added. The mixture is heated to boiling until a clear solution is produced (1½ hours), cooled to 20° C, and the acid chloride formed is precipitated with a 3-fold to 4-fold quantity of petroleum ether. The product is filtered off, washed with petroleum ether and dried in vacuo at 40° C.

4.7 g (80 percent) of N-carbethoxy-5-aminoisophthaloyl chloride are obtained in the form of fine white small needles of melting point 77° C. Elementary analysis: Calculated: C 45.54, H 3.13, Cl 24.44, N 4.83; Found: C 45.84, H 3.19, Cl 24.3, N 4.80.

Analogously to the manufacture of the compound (b) in Example 4, the aminomonoazo dyestuff of formula (a) and N-carbethoxy-5-aminoisophthaloyl chloride yield the dyestuff of formula (d)
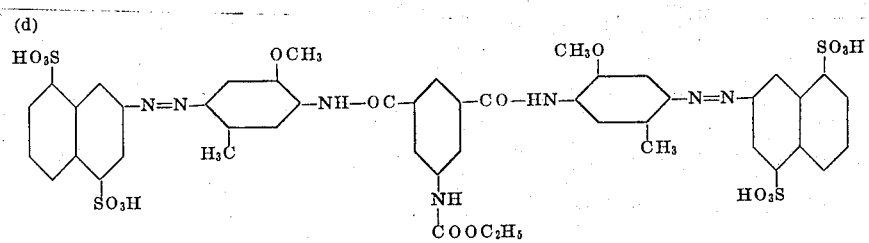

in 90 percent yield. 11.2 g of this dyestuff are stirred at 55 to 60° C into a mixture of 1.5 ml of 48 percent strength hydrobromic acid and 10 ml of glacial acetic acid until the carbethoxy group has been completely split off, the product is filtered off and washed with ethanol, and the crude product is purified by repeated reprecipitation.

0.2 to 0.4 g of amino-disazo dyestuff of formula (e)
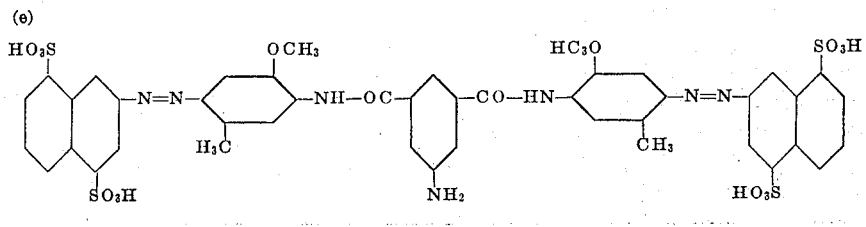

are obtained. Thereafter the procedure given in Example 4 is followed and the dyestuff of formula IX is obtained.

EXAMPLE 6

1-aminobenzene-3,5-dicarboxylic acid is diazotised in the usual manner and coupled on to 1-phenyl-3-carbethoxy-5-pyrazolone.

4 g of this dyestuff are boiled for 1 hour in 20 ml of benzene and 5 ml of thionyl chloride, the solution is filtered, cooled and suction-filtered, and the residue recrystallized from benzene. Yield: 2.9 g of acid dichloride, melting point: 187° C.

0.6 g of 2-(4'-amino-5'-methoxy-2'-methylphenyl)-azonaphthalene-4,8-disulphonic acid are dissolved in 5 ml of methylpyrrolidone and 0.5 ml of pyridine and 0.2 g of the acid dichloride are added at 110° C. The addition of the acid dichloride is continued until the spot test no longer shows any amine. Working up takes place analogously to that described in Example 3.
Yield: 0.4 g of the potassium salt of the dyestuff of formula X.

The dyestuff of formula XI is manufactured in an analogous manner.

EXAMPLE 7

1-Aminobenzene-3,5-dicarboxylic acid is diazotised in the usual manner, coupled on to 1-amino-2-methyl-5-methoxybenzene, and the amino group is acetylated with acetic anhydride.

3.6 g of the dyestuff are dissolved in 50 ml of dimethylformamide, 2 ml of thionyl chloride are added and the mixture is stirred for half an hour at 20° C. Dry air is then drawn through the solution for one hour and the remaining reaction solution is then made up to 100 ml with dimethylformamide. 4.5 g of 2-(4'-amino-5'-methoxy-2'-methylphenyl)-azo-naphthalene-4,8-disulphonic acid are dissolved in 50 ml of methylpyrrolidone and 5 ml of pyridine and at 100° C the acid dichloride solution manufactured above added dropwise until the spot test no longer shows any amine. 50 ml of the solution are consumed. The reaction mixture is stirred into 200 ml of acetone and the precipitate is filtered off and washed with acetone. After boiling three times with 60 ml at a time of 1 percent strength potassium acetate solution in methyl alcohol, 3.9 g of the potassium salt of the dyestuff of formula XII are obtained.

EXAMPLE 8

1-Aminobenzene-3,5-dicarboxylic acid is diazotized in the usual manner, coupled on to 1-phenyl-5-pyrazolone-3-carboxylic acid amide, and the dyestuff crystallized from dimethylformamide.

8 g of dyestuff are dissolved in 60 ml of dimethylformamide, cooled to 15° C, and 6 ml of thionyl chloride are added all at once. The temperature rises to 45° C. The dyestuff which on cooling has partially crystallized out dissolves. Within a few minutes the solution changes into a crystal sludge which is stirred for 1 hour at 30° C waterbath temperature. Thereafter dry air is drawn through the crystal sludge for 1 hour by means of a vacuum pump and the mixture then made up to 100 ml with dimethylformamide.

15 g of 2-(4'-amino-5'-methoxy-2'-methylphenyl)-azo-naphthalene-4,8-disulphonic acid are dissolved in 130 ml of methylpyrrolidone and 15 ml of pyridine and the suspension of the dicarboxylic acid dichloride, obtained above, is added at 100° C until amine can no longer be detected by diazotization and coupling by means of the so-called spot reaction. 130 ml of 20 percent strength alcoholic potassium acetate solution, 130 ml of methanol and 100 ml of alcohol are then added and the mixture is cooled for 3 hours in ice. It is suction-filtered and the residue is twice boiled with 100 ml of methanol at a time. Yield: 14.6 g of the potassium salt of the dyestuff of formula XIII.

EXAMPLE 9

1-Aminobenzene-3,5-dicarboxylic acid is diazotized in the usual manner, coupled on to β-naphthol, and the dyestuff is crystallized from dimethylsulphoxide.

4 g of this dyestuff are boiled for 2 hours in 10 ml of dimethylformamide and 40 ml of acetic anhydride, the mixture cooled in ice, and the product filtered off and washed with a little ether. 4 g of 1-naphthyl-2-acetoxy-3',5'-azobenzenedicarboxylic acid are obtained.

2 g of this dyestuff are suspended in 20 ml of toluene, boiled with 2 ml of thionyl chloride and 0.5 ml of dimethylformamide until completely dissolved, and the solution filtered and cooled. The acid dichloride is filtered off and crystallized from toluene. 1.2 g of acid dichloride of decomposition point 177° C are obtained. 2 g of 2-(4'-amino-5'-methoxy-2'-methylphenyl)-azo-naphthalene-4,8-disulphonic acid are dissolved in 20 ml of methylpyrrolidone and 1 ml of pyridine and 1 g of the acid dichloride is added at 100° C. The addition of the acid dichloride is continued until a spot test no longer shows any amine. The reaction mixture is treated with 30 ml of methanol and 10 ml of a 20 percent strength solution of potassium acetate in methyl alcohol and is cooled in ice for 2 hours. It is suction-filtered and the residue twice washed with 50 ml at a time of an 0.5 percent strength solution of potassium acetate in methyl alcohol.

1.3 g of the potassium salt of the dyestuff of formula XIV are obtained.

EXAMPLE 10

1-Aminobenzene-3,5-dicarboxylic acid is diazotized in the usual manner and coupled on to 1-phenyl-3-carboethoxy-5-pyrazolone. The acid dichloride is manufactured from the dyestuff, in accordance with Example 6.

1.5 g of 2-(4'-amino-5'-methoxy-2'-chlorophenyl)-azo-naphthalene-4,8-disulphonic acid are dissolved in 60 ml of methylpyrrolidone and 1.5 ml of pyridine and 1.1 g of the acid dichloride are added thereto at 100° C. Further acid dichloride is added until a spot test no longer shows any amine. The reaction solution is filtered hot and the mother liquor is treated with 15 ml of 20 percent strength alcoholic potassium acetate solution and with 300 ml of methanol and filtered. The residue is washed with methanol, twice boiled with an 0.5 percent strength solution of potassium acetate in alcohol, filtered off hot and washed with methanol. After drying in vacuo at 60° C the residue is dissolved in 5 ml of dimethylsulphoxide, the hot solution is treated with methanol until it begins to turn turbid, cooled in ice, and the product filtered off and washed with methanol.

0.8 g of the potassium salt of the dyestuff of formula XV are obtained.

EXAMPLE 11

1-Aminobenzene-3,5-dicarboxylic acid is diazotized in the usual manner and coupled on to 1-phenyl-3-methyl-5-pyrazolone. The acid dichloride is manufactured from the dyestuff analogously to Example 3.

3 g of 2-(4'-amino-5'-methoxy-2'-acetylaminophenyl)-azo-naphthalene-4,8-disulphonic acid are dissolved in 100 ml of methylpyrrolidone and 5 ml of pyridine and 1.4 g of the acid dichloride are added at 100° C. The addition of the acid dichloride is continued until a spot test no longer shows any amine. The reaction solution is mixed with 10 ml of a 20 percent strength solution of potassium acetate in alcohol and introduced into 300 ml of acetone. The product is filtered off and washed with acetone. The residue is boiled three times with 50 ml at a time of a 1 percent strength potassium acetate solution in methyl alcohol. Yield: 2.3 g of the potassium salt of the dyestuff of formula XVI.

EXAMPLE 12

1-Aminobenzene-3,5-dicarboxylic acid is diazotized in the usual manner, coupled on to α-naphthol, and the dyestuff is crystallized from a mixture of 300 ml of dimethylformamide and 200 ml of methanol. 3 g of the dyestuff are suspended in 40 ml of toluene, treated with 4 ml of thionyl chloride and 2 ml of dimethylformamide, and boiled for 10 minutes. The mixture is filtered hot and the filtrate cooled to −10° C, filtered, and the residue washed with petroleum ether. The residue is then recrystallized from 30 ml of toluene and 1 g of charcoal. Yellow crystals of melting point 201° to 203° C are obtained. Yield: 2.2 g.

3 g of 2-(4'-amino-5'-methoxy-2'-methylphenyl)-azo-naphthalene-4,8-disulphonic acid are dissolved in 60 ml of methylpyrrolidone and 4 ml of pyridine and 1.3 g of the acid dichloride manufactured above are added to 100° to 110° C. The addition of the acid dichloride is continued until no further amine can be detected by means of the so-called spot reaction. The reaction solution is then mixed with 15 ml of a 20 percent solution of potassium acetate in alcohol and with 100 ml of methanol, and the product filtered off, washed with methanol and dried in vacuo at 60° C. The product is boiled up with 30 ml of methylpyrrolidone, the solution filtered hot and cooled in ice, and the product filtered off, washed with methylpyrrolidone and then with methanol and dried in vacuo at 60°C.

2.1 g of the potassium salt of the dyestuff of formula XVII are obtained.

EXAMPLE 13

2-Aminonaphthalene-5,7-disulphonic acid is diazotized in the usual manner, coupled on to 1-amino-2-methoxy-5-methylbenzene, and the dyestuff is crystallized from dimethylformamide. 2-(4'-amino-5'-methoxy-2'-methylphenyl)-azo-naphthalene-5,7-disulphonic acid is obtained.

61.2 g of 1-phenyl-5-pyrazolone-3-carboxylic acid are suspended in 400 ml of ethylene glycol monoethyl ether and boiled for 5 hours whilst introducing hydrogen chloride. The reaction solution is stirred into 1000 g of ice and 500 ml of water, and the product is filtered off, washed with water until neutral and dried at 60° C in vacuo. 59 g of 1-phenyl-3-carboxylic acid-ethoxyethyl ester-5-pyrazolone are obtained.

9.1 g of m-amino-isophthalic acid are dissolved in 50 ml of water and 4 g of sodium hydroxide, treated with 12.5 ml of 4N sodium nitrite solution, and slowly introduced into a mixture of 100 g of ice and 30 ml of 25 percent strength hydrochloric acid. The resulting suspension of the diazo compound is slowly added, at 10° to 15° C, to a solution of 13 g of 1-phenyl-3-carbethoxy-ethoxy-5-pyrazolone in 50 ml of 25 percent strength ammonia and 70 ml of water, and the mixture is stirred for 30 minutes at room temperature. 30 ml of 100 percent strength acetic acid are then added to the solution which is stirred for a further 12 hours. The dyestuff is filtered off, washed with water and dried in vacuo at 60° C. After recrystallization from 100 percent strength acetic acid 8.7 g of dyestuff having a decomposition point of 279° C are obtained.

60 g of this dyestuff are suspended in 250 ml of benzene, treated with 30.7 ml of thionyl chloride and 4 ml of dimethylformamide and boiled for 3 hours whilst stirring. A clear solution is produced. This is cooled for 5 hours in ice water whilst stirring, filtered, and the residue rinsed with 50 ml of petroleum ether and recrystallized from 150 ml of benzene and 5 g of charcoal.

37 g of 1-phenyl-3-carboxylic acid-ethoxyethyl ester-4-(phenylazo-3',5'-dicarboxylic acid dichloride)-5-pyrazolone are obtained; melting point: 164° C.

1.5 g of 2-(4'-amino-5'-methoxy-2'-methylphenyl)-azo-naphthalene-5,7-disulphonic acid are dissolved in 12 ml of methylpyrrolidone and 1 ml of pyridine at 80° C and 1 g of 1-phenyl-3-carboxylic acid-ethoxyethyl ester-4-(phenylazo-3',5'-dicarboxylic acid dichloride)-5-pyrazolone are added at this temperature. The mixture is allowed to cool to room temperature whilst stirring, treated with 100 ml of acetone and filtered. The residue is washed with 100 ml of acetone, twice boiled with 50 ml of alcohol, then boiled for 10 minutes with a mixture of 100 ml of methanol and 10 ml of 20 percent strength potassium acetate solution in methyl alcohol, filtered off hot and twice washed with 50 ml at a time of hot methanol. 1 g of the potassium salt of the dyestuff of formula XVIII is obtained.

The dyestuffs of formulas XXI and XXII are manufactured in an analogous manner.

EXAMPLE 14

2-Aminonaphthalene-4,8-disulphonic acid is diazotized in the usual manner and coupled on to 1-amino-2-ethoxybenzene. The dyestuff 2-(4'-amino-3'-ethoxyphenyl)-azo-naphthalene-4,8-disulphonic acid crystallizes from dimethylformamide and is reacted with the 1-phenyl-3-carboxylic acid-ethoxyethyl ester-4-(phenylazo-3',5'-dicarboxylic acid dichloride)-5-pyrazolone manufactured according to example 13, analogously to the described in example 13. The potassium salt of the dyestuff of formula XIX is obtained.

EXAMPLE 15

2-Aminonaphthalene-4,8-disulphonic acid is diazotized in the usual manner and coupled on to 1-amino-3-succinylaminobenzene. 2-(4'-amino-2'-succinylaminophenyl)-azo-naphthalene-4,8-di-sulphonic acid is obtained and this is reacted with 1-phenyl-3-carboxylic acid-ethoxyethyl ester-4-(phenylazo-3', 5'-dicarboxylic acid dichloride)5-pyrazolone (manufactured according to Example 13) analogously to the instructions in Example 13. The potassium salt of the dyestuff of formula XX is obtained.

EXAMPLE 16

2-Aminonaphthalene-4,8-disulphonic acid is diazotized in the usual manner and coupled on to 1-amino-2,5-dimethoxybenzene, and the dyestuff is crystallized from dimethylformamide. 2-(4'-amino-2',5'4,8-disulphonic acid is obtained.

1-Phenyl-3-carbethoxy-4-(3',5'-dicarboxylic acid-phenylazo)-5-pyrazolone is converted into the dichloride according to Example 6.

5 g of 2-(4'-amino-2',5'-dimethoxyphenyl)-azo-naphthalene-4,8-disulphonic acid are dissolved in 200 ml of N-methyl pyrrolidone at 80° C; 10 ml of pyridine followed by 9.5 g of the dichloride manufactured according to Example 6 are then added. The mixture is then stirred for a further 2 hours without supply of heat and the reaction mixture is introduced into 1000 ml of acetone and filtered. The residue is twice washed with 100 ml of methanol at a time, boiled with 100 ml of methanol for 15 minutes, filtered hot, washed with 50 ml of methanol and dried in vacuo at 60° C. This product is dissolved in 20 ml of dimethylformamide at 100° C, the solution is filtered, the filtrate is treated with 10 ml of a 20 percent strength solution of potassium acetate in methyl alcohol and cooled to room temperature, and the residue is washed with 50 ml of methanol. 5.4 g of the dyestuff of formula XXIV are obtained The dyestuffs of formulas XXV and XXVI are manufactured in an analogous manner.

EXAMPLE 17

4-Methoxyphenyl-azobenzene-3',5'-dicarboxylic acid dichloride is manufactured as specified in Example 1.

1.2 g of 7-amino-8-(4'-aminophenylazo)-1-naphthol-3,2'-disulphonic acid are dissolved in 80 ml of methylpyrrolidone and 2 ml of pyridine and treated with 0.34 g of 4-methoxyazobenzene-3',5'-dicarboxylic acid dichloride at 20° C. The addition of this dicarboxylic acid dichloride is continued until an amino group can no longer be detected. The solution is introduced into 300 ml of acetone and filtered. The residue is washed three times with 100 ml of acetone at a time, and boiled three times with 30 ml of methanol at a time. The residue is again boiled with 30 ml of a 1 percent strength solution of potassium acetate in methyl alcohol, filtered off and twice washed with 10 ml of methanol. Yield: 0.7 g of the potassium salt of the dyestuff of formula XXXIII.

EXAMPLE 18

1-Aminobenzene-3,5-dicarboxylic acid is diazotized in the usual manner and coupled on to 1-phenyl-3-acetylamino-5-pyrazolone. 9.6 g of the dyestuff are dissolved in 50 ml of dimethylformamide, treated with 50 ml of methanol whilst hot, cooled in ice, and the product filtered off and washed with methanol. Melting point: 312° to 314° C, with decomposition.

2 g of the dyestuff are dissolved in 20 ml of dimethylformamide and 1.5 ml of thionyl chloride are added at 20° C. The mixture is stirred for 12 hours and the product filtered off and washed with 2 ml of dimethylformamide and then with benzene and petroleum ether. 2.2 g of acid dichloride are obtained.

2 g of 2-(4'-amino-5'-methoxy-2'-methylphenyl)-azo-naphthalene-4,8-disulphonic acid are dissolved in 40 ml of methylpyrrolidone with addition of 5 ml of pyridine, and treated with 1 g of the acid dichloride at 100° to 110° C. The addition of the acid dichloride is continued if appropriate until amine can no longer be detected by means of the spot test. The reaction solution is then treated with 10 ml of a 20 percent strength solution of potassium acetate in alcohol and with 50 ml of methanol, and filtered. The residue is washed with methanol, boiled three times with 50 ml at a time of a 2 percent strength solution of potassium acetate in methyl alcohol, and filtered hot. The residue is dried at 60° C. in vacuo and extracted with methanol for 12 hours. 1.1 g of the potassium salt of the dyestuff of formula XXVII are obtained.

EXAMPLE 19

1-Aminobenzene-3,5-dicarboxylic acid is diazotized in the usual manner and coupled on to 1-phenyl-3-carbethoxypyrazolone. The dicarboxylic acid dichloride is manufactured therefrom as specified in Example 6.

4.5 g of 2-(4'-aminonaphthyl)-azo-naphthalene14,8-disulphonic acid are dissolved in 300 ml of N-methylpyrrolidone and 2 ml of pyridine and 2 g of the acid dichloride are added at 100° C whilst stirring. The addition of the acid dichloride is continued until no further amine can be detected in the reaction solution. The reaction solution, warmed to 40° C, is stirred into 1300 ml of acetone and the resulting precipitate is filtered off and washed with acetone. The filtration residue is treated with 100 ml of methanol and 20 ml of a 20 percent strength solution of potassium acetate in alcohol over the course of 30 minutes, whilst stirring, filtered off whilst hot, and the residue washed four times with 20 ml at a time of methanol. Yield: 2.1 g of the potassium salt of the dyestuff of formula XXVIII.

EXAMPLE 20

The procedure specified in Example 4 is followed but the diazo solution of the reduced diazo dyestuff is added at 5° C, under conditions which are acid to Congo Red, to a solution of 3 g of 7-amino-1-naphthol-3-sulphonic acid in 30 ml of water.

The potassium salt of the dyestuff of formula XXIX is obtained in the form of a rust-red powder, in almost quantitative yield.

The dyestuffs of formulas XXX, XXXI and XXXII are obtained in an analogous manner.

EXAMPLE 21

10.2 g of the dyestuff of formula (f)
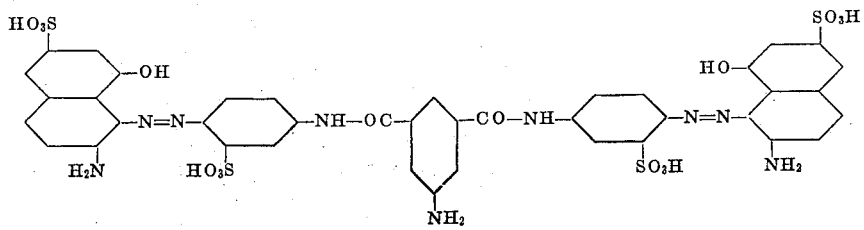

manufactured analogously to Example 4, are suspended in 250 ml of water at a pH-value of 7, 3 ml of 4N sodium nitrite solution followed by 48 percent strength hydrobromic acid until the mixture reacts acid to Congo Red, are added at 5° C, the excess nitrite is destroyed after 1 hour in the usual manner and the diazo solution is added at 5° C, under conditions acid to Congo Red, to a solution of 3 g of 7-amino-1-naphthol-3-sulphonic acids in 30 ml of water. The mixture is stirred for 12 hours at room temperature and the precipitated product is filtered off, reprecipitated from an aqueous solution by means of potassium acetate, filtered off, washed with water and ethanol and dried in vacuo at 60° C.

The potassium salt of the dyestuff of formula XXXIV is obtained in almost quantitative yield in the form of a dark red powder.

The dyestuff of formula XXXV is obtained in an analogous manner.

EXAMPLE 22

The procedure of Example 21 is followed but the diazo solution of the amino disazo dyestuff is added to a solution of 1.7 g of 2-naphthol in 20 ml of water at a pH-value of 10, at 5° C. The potassium salt of the dyestuff of formula XXXVI is obtained in almost quantitative yield in the form of a dark red powder.

EXAMPLE 23

16.0 g of the complex dyestuff of formula (g)
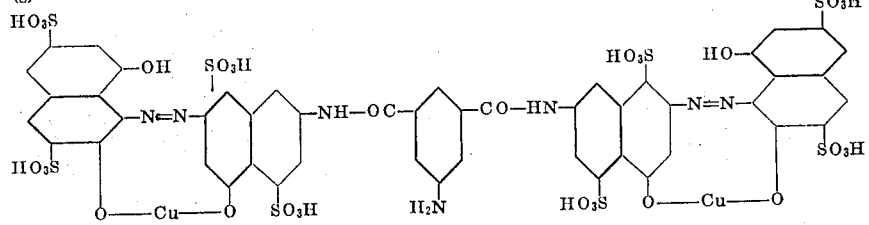

which is manufactured analogously to Example 4 and subsequently after-treated to introduce copper, are suspended in 250 ml of water at a pH-value of 7, 3 ml of 4N sodium nitrite solution followed by 48 percent strength hydrobromic acid until the mixture reacts acid to Congo Red are added at 5° C, the excess nitrite is destroyed after 1 hour in the usual manner, and sufficient potassium acetate is added for Congo Red paper only to retain a weak violet color.

The diazo solution thus obtained is introduced at 5° C into a solution of 2.4 g of acetoacetic acid-o-anisidine in 40 ml of water which is buffered with potassium acetate and adjusted to pH 6. The mixture is stirred for 12 hours at room temperature and the precipitated product is filtered off, washed with water and ethanol and dried in vacuo at 60°C.

The potassium salt of the dyestuff of formula XXXVII is obtained in almost quantitative yield in the form of a dark blue powder.

EXAMPLE 24

The procedure of Example 22 is followed but the diazo solution of the amino disazo dyestuff is added to a solution of 3.6 g of 7-amino-1-naphthol-3,6-disulphonic acid in 40 ml of water under conditions which are acid to Congo Red. After reprecipitation from an aqueous solution by means of potassium acetate, the potassium salt of the dyestuff of formula XXXVIII is obtained in almost quantitative yield in the form of a dark blue powder.

EXAMPLE 25

2 g of 2-(4'-amino-2'-methylphenyl)-azo-6-acetylamino-naphthalenen4,8-disulphonic acid are dissolved in 40 ml of methylpyrrolidone and 1 ml of pyridine and treated with 1 g of the acid dichloride according to Example 12. The addition of acid dichloride is continued until the spot test is negative. The reaction mixture is then treated with 10 ml of a 20 percent strength potassium acetate solution and with 50 ml of methanol, cooled to room temperature and filtered off. The residue is washed with methanol, dried in vacuo at 60° C, dissolved in a little dimethylsulphoxide, the solution filtered and treated with an equal volume of methanol, and the product filtered off and washed with methanol.

1.2 g of the potassium salt of the dyestuff of formula XXXIX of Table I are obtained.

EXAMPLE 26

1-Aminobenzene-3,5-dicarboxylic acid is diazotized in the usual manner, coupled on to α-naphthol, and the acid dichloride of the dyestuff according to Example 12 is manufactured. 2 g of 2-(4'-amino-5'-methoxy-2'-methylphenyl)-azo-6-acetyl-amino-naphthalene-4,8-disulphonic acid are condensed with the acid dichloride according to Example 1.

1.4 g of the potassium salt of the dyestuff of formula XL of Table I are obtained.

Example 27

2 g of 2-(4'-amino-5'-methoxy-2'-methylphenyl)-azo-6-acetyl-amino-naphthalene-4,8-disulphonic acid are dissolved in 30 ml of methylpyrrolidone and 2 ml of pyridine and mixed at 100 to 110° C with 1.4 g of the acid dichloride according to Example 6. The addition of the acid dichloride is continued until the spot test no longer shows any amine. The reaction mixture is treated with 70 ml of methanol and 20 ml of a 20 percent strength solution of potassium acetate in alcohol, and the product is filtered off and washed four times with 50 ml at a time of hot methanol. The residue is dried in vacuo at 60° C and crystallized from 30 ml of methylpyrrolidone.

1.3 g of the potassium salt of the dyestuff of formula XLI of Table I are obtained.

EXAMPLE 28

2.5 g of 2-(4'-amino-5'-methoxy-2'-methylphenyl)-azo-6-acetylamino-naphthalene-4,8-sulphonic acid are dissolved in 40 ml of methylpyrrolidone and 2 ml of pyridine and 1.1 g of the dichloride according to Example 3 are introduced at 110° C. The addition of the dichloride is continued until the spot test no longer indicates any amine. The reaction solution is then introduced into 150 ml of acetone and the product is filtered off and washed with acetone. The residue is boiled three times with 50 ml at a time of a 1 percent strength solution of potassium acetate in methyl alcohol. Yield: 1.2 g of the potassium salt of the dyestuff of formula XLII of Table I.

EXAMPLE 29

2 g of 2-(4'-acetylamino-5'-β-hydroxyethoxy-2'-methyl-phenyl)-azo-6-amino-naphthalene-4,8-disulphonic acid are dissolved in 30 ml of methylpyrrolidone and 2 ml of pyridine at 80° C and 0.95 g of the acid dichloride according to Example 6 are added thereto at the same temperature. The addition of the acid dichloride is continued until no further amine can be detected. The solution is then treated with 10 ml of a 20 percent strength solution of potassium acetate in alcohol and 50 ml of alcohol, boiled for 15 minutes, cooled, and the product filtered off, washed three times with 20 ml of alcohol at a time and dried. The dyestuff is then heated for 1 hour with 20 ml of a 20 percent strength aqueous potassium acetate solution on a steam bath, filtered off, washed with 20 ml of a 3 percent strength potassium acetate solution and then twice with 20 ml at a time of methanol and dried. Yield: 1.9 g of the potassium salt of the dyestuff of formula XLIII OF Table I.

EXAMPLE 30

1.4 g of the dyestuff of formula (h)

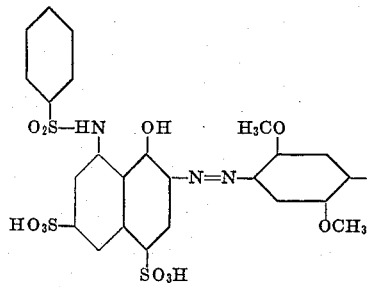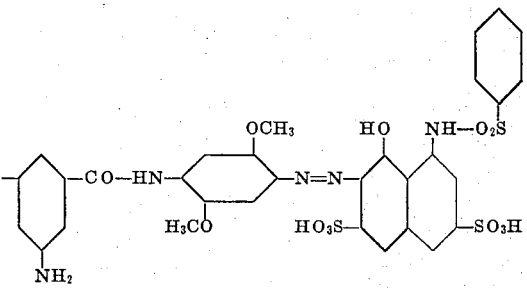

manufactured analogously to the dyestuff of formula (c) in Example 4, are coupled to 0.25 g. of acetoacetic acid-o-anisidide in the same way as described in Example 23.

1.0 g of the potassium salt of the dyestuff of formula XLIV is obtained in the form of a dark brown powder.

EXAMPLE 31

1.2 g of the aminomonoazo dyestuff of formula (i)

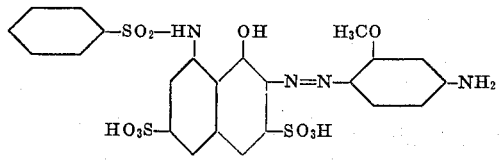

manufactured in the usual manner are dissolved in 20 ml of water and treated at a pH-value of 9.4 with a suspension of 0.5 g of the acid chloride of formula (j)

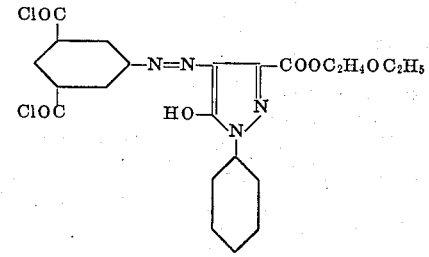

manufactured analogously to Example 6, in 4 ml of acetone. The mixture is stirred for 2½ hours at room temperature, the reaction product is precipitated with acetone and the potassium salt of the dyestuff of formula XLV is obtained in almost quantitative yield in the form of a dark blue powder.

EXAMPLE 32

3.0 g of the aminomonoazo dyestuff of formula (i) are dissolved in 40 ml of water and after adding 0.8 g of crystalline potassium acetate are treated, at a pH-value of 9.0 to 9.4, with a solution of 1.0 g of the p-methoxyphenylazobenzene-3,5-dicarboxylic acid dichloride manufactured according to Example 1, in 10 ml of acetone.

The addition of the acid chloride is repeated two more times at intervals of 1 hour.

The reaction product is precipitated with acetone and 2.5 g of the potassium salt of the dyestuff of formula XLVI are obtained in the form of a dark blue powder.

Table I

Compounds according to formula (3)

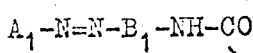
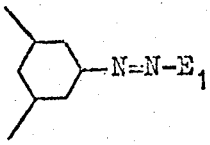
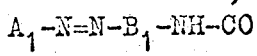

| Formula No. | Residue = $A_1-N=N-B_1-NH-CO-$ according to formula (3) | Residue $-E_1$ according to formula (3) | Absorption maximum (nm) |
|---|---|---|---|
| I | HO₃S-[naphthyl(HO₃S)]-N=N-[phenyl(OCH₃)(CH₃)]-NH-CO- | —⟨phenyl⟩—OCH₃ | 406 1) |
| II |  | —⟨phenyl⟩ with CH₃ and OCH₃ | 403 1) |
| III |  | —⟨phenyl⟩ with CH₃, OCH₃, CH₃ | 406 1) |
| IV |  | —⟨phenyl⟩—OH | 404 1) |
| V |  | —⟨phenyl⟩—OH with H₃C and CH₃ | 406 1) |

| | | | | |
|---|---|---|---|---|
| VI | (structure: naphthalene-disulfonic acid with SO$_3$H, HO$_3$S, N=N, OCH$_3$, H$_3$C, NH-CO-) | (structure: OCH$_3$, OH on ring) | 404 | 1) |
| VII | | (structure: ring with CH$_3$, OH, H$_3$C, CH$_3$) | 410 | 1) |
| VIII | | (structure: ring with CH$_3$, OH, CH$_3$) | 404 | 1) |
| IX | | (pyrazolone structure with OH, N-phenyl, CH$_3$) | 410 | 1) |
| X | | (pyrazolone structure with OH, N-phenyl, COOC$_2$H$_5$) | 414 | 1) |
| XI | | (pyrazolone structure with OH, N-naphthyl, COOC$_2$H$_5$) | 416 | 1) |

| | | | | |
|---|---|---|---|---|
| XII | ![structure: naphthalene with 2 SO3H, -N=N- to benzene with OCH3, CH3, NH-CO-] | ![structure: benzene with CH3, OCH3, NH-COCH3] | 410 | 1) |
| XIII | | ![pyrazolone structure with OH, N-phenyl, CO-NH2] | 415 | 1) |
| XIV | | ![naphthalene with COCH3] | 416 | 1) |
| XV | ![naphthalene with 2 SO3H, -N=N- to benzene with OCH3, Cl, NH-CO-] | ![pyrazolone with OH, N-phenyl, COO-C2H5] | 432 | 1) |
| XVI | ![naphthalene with 2 SO3H, -N=N- to benzene with OCH3, NH-COCH3, NH-CO-] | ![pyrazolone with OH, N-phenyl, CH3] | 410 | 1) |

| | | | | |
|---|---|---|---|---|
| XVII | HO₃S-[naphthalene]-N=N-[benzene with OCH₃, H₃CO]-NH-CO- ; SO₃H | [naphthol]-OH | 408 | 1) |
| XVIII | | structure with OH, C-N-phenyl, C=N, O=C-O-CH₂CH₂OCH₂CH₃ | 404 | 1) |
| XIX | HO₃S-[naphthalene]-N=N-[benzene with OC₂H₅]-NH-CO- ; SO₃H | | 408 | 1) |
| XX | HO₃S-[naphthalene]-N=N-[benzene with HN-CO-CH₂CH₂COOH]-NH-CO- ; SO₃H | | 415 | 1) |
| XXI | HO₃S-[naphthalene]-N=N-[benzene with OCH₃, H₃CO]-NH-CO- ; SO₃H | | 414 | 1) |

| | 41 | 42 | | |
|---|---|---|---|---|
| XXII | HO₃S–⬡(OCH₃)–N=N–⬡(OCH₃, H₃C)–NH–CO– | HO–C=C(–N–phenyl)–C=N, O=C–O–CH₂CH₂OCH₂CH₃ | 404 | 1) |
| XXIII | HO₃S–(naphthyl, SO₃H)–N=N–⬡(Cl, OCH₃)–NH–CO– | HO–C=C(–N–phenyl)–C=N, H₃C | 432 | 1) |
| XXIV | HO₃S–(naphthyl, SO₃H)–N=N–⬡(OCH₃, OCH₃)–NH–CO– | HO–C=C(–N–phenyl)–C=N, COOC₂H₅ | 434 | 1) |
| XXV | HO₃S–(naphthyl, SO₃H)–N=N–⬡(CH₃, HN–COCH₃)–NH–CO– | | 400 | 1) |
| XXVI | HO₃S–(naphthyl, SO₃H)–N=N–⬡(OCH₃, H₃C)–NH–CO– | | 414 | 1) |

| | | | | |
|---|---|---|---|---|
| XXVII | [naphthalene with HO₃S, SO₃H groups]-N=N-[benzene with OCH₃, H₃C]-NH-CO- | [pyrazolone: HO-C=C-N(phenyl)-N=C-, HN-COCH₃] | 408 | 1) |
| XXVIII | [naphthalene with HO₃S, SO₃H]-N=N-[naphthalene]-NH-CO- | [pyrazolone: HO-C=C-N(phenyl)-N=C-COOC₂H₅] | 416 | 1) |
| XXIX | [naphthalene with HO₃S, SO₃H]-N=N-[benzene with OCH₃, H₃C]-NH-CO- | [naphthalene with H₂N, HO, SO₃H] | 409<br>500<br>395<br>495 | 1)<br>2)<br>3)<br>4) |
| XXX | | [pyrazolone: HO-C=C-N(C₆H₄-SO₃H)-N=C-COOH] | 412 | 1) |
| XXXI | | [benzene with OCH₃, NH₂, H₃C] | 415 | 1) |
| XXXII | | [benzene with OCH₃, CH₃, NH-SO₂-C₆H₄-CH₃] | 399 | 3) |

| | Diazo component | Coupling component | λ | |
|---|---|---|---|---|
| XXXIII | (naphthalene with HO₃S, OH, NH₂, –N=N–C₆H₄–NH–CO–) | –C₆H₄–OCH₃ | 510 | 1) |
| XXXIV | | (naphthalene with H₂N, HO, SO₃H) | 518 | 3) |
| XXXV | (naphthalene with HO₃S, OH, HN–C₆H₃(CH₃)₂, –N=N–C₆H₃(SO₃H)–NH–CO–) | H₃C–C₆H₃–CH₃ –NH– (naphthalene with HO, SO₃H) | 539 | 3) |
| XXXVI | (naphthalene with HO₃S, OH, NH₂, –N=N–C₆H₃(SO₃H)–NH–CO–) | (naphthalene with HO) | 516 | 3) |
| XXXVII | (naphthalene with HO₃S, OH, HO₃S, –O–Cu–O–, –N=N–naphthalene(SO₃H, SO₃H)–NH–CO–) | –CO–NH–C₆H₄–OCH₃, –C(=CH–CH₃)–OH | 595 | 3) |

| | | | | |
|---|---|---|---|---|
| XXXVIII | (structure: dihydroxy/sulfonated naphthalene azo naphthalene with Cu complex, SO₃H groups, NH-CO-) | (structure: H₂N-, SO₃H, HO-, SO₃H substituted benzene) | 594 | 3) |
| XXXIX | (structure: HO₃S-, HN(COCH₃)-, SO₃H naphthalene -N=N- benzene(CH₃)-NH-CO-) | (naphthol -OH) | 400 | 1) |
| XL | (structure: HO₃S-, HN(COCH₃)-, SO₃H naphthalene -N=N- benzene(OCH₃, CH₃)-NH-CO-) | (naphthol -OH) | 414 | 1) |
| XLI | (structure: HO₃S-, HN(COCH₃)-, SO₃H naphthalene -N=N- benzene(OCH₃, CH₃)-NH-CO-) | (pyrazolone: C₂H₅OOC-C, C-OH, CH₃, N-N-phenyl) | 432 | 1) |

| | | | |
|---|---|---|---|
| XLII | (structure) | (structure) | 408 [1] |
| XLIII | (structure) | (structure) | 400 [1] |
| XLIV | (structure) | (structure) | 586 [1] |
| XLV | (structure) | (structure) | 588 [3]<br>404 [4] |
| XLVI | (structure) | (structure) | 586 [3] |

Notes on Table I.
1) Measured in gelatine.
2) Shoulder measured in gelatine.
3) Principal maximum measured in dimethylformamide-water (1:1
4) Subsidiary maximum measured in dimethylformamide-water (1:1).

EXAMPLE 33

0.7 ml of a 1 percent strength aqueous solution of dyestuff No. X of Table I are added at 40° C to 3.3 ml of a 6 percent strength aqueous gelatine. 3.3 ml of a gelatine-silver bromide emulsion at 40° C are added thereto, as are optionally 1 to 2 ml of a aqueous solution of a spreading agent, for example saponin, and a hardener, for example dimethylolurea. This mixture is cast on to a 13 cm · 18 cm glass plate and dried.

It is then exposed to light behind a step wedge and the silver image is developed with a 1-methylamino-4-hydroxybenzenesulphate-hydroquinone developer and fixed.

The image dyestuff is bleached, as a function of the amount of silver present, in a bath containing, in 1000 ml, 30 to 100 ml of 32 percent strength hydrochloric acid, 40 to 120 g of potassium bromide, 30 to 50 g of thiourea and 0.001 to 0.01 g of 2-amino-3-hydroxyphenazine.

After an intermediate soaking the excess silver is removed in a bath containing, in 1000 ml, 100 g of sodium chloride, 100 g of crystalline copper sulphate and 50 ml of 37 percent strength hydrochloric acid. The image is finally fixed in the usual manner. A yellow color wedge is obtained which represents an inverse image to the original silver wedge and which is completely bleached in the areas of originally the highest silver density. Such a yellow image can also be part of a multi-color material.

Similar results are obtained if instead of the dyestuff of formula No. X another yellow dyestuff of Table I is used.

EXAMPLE 34

The following layers are successively applied to an opaque white acetate film provided with an adhesive layer:
1. Silver bromide emulsion in gelatin, sensitive to red, containing the greenish-blue dyestuff of formula (53)

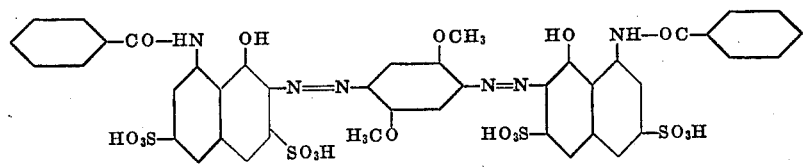

2. Colorless gelatine layer without silver halide.
3. Silver bromide emulsion in gelatine, sensitive to green, containing the purple dyestuff of formula (54)

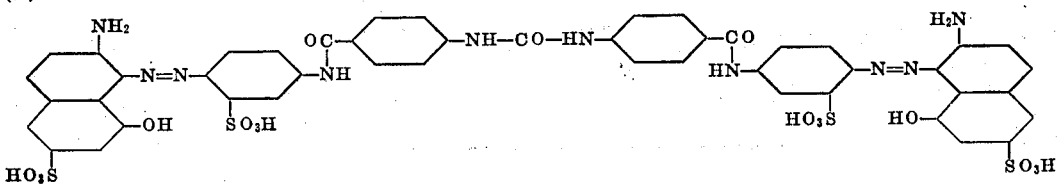

4. Yellow filter layer containing the dyestuff of formula (55)

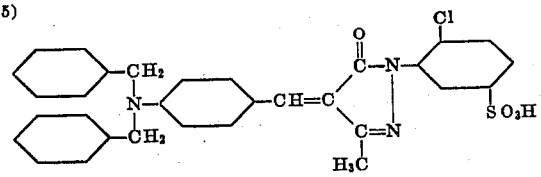

5. Silver bromide emulsion in gelatine, sensitive to blue, containing the yellow dyestuff No. X in Table I.

The gelatine layers may further contain additives such as wetting agent, hardeners and stabilizers for the silver halide. In other respects the procedure is that the individual layers contain 0.5 g of the particular dyestuff and the amount of silver bromide corresponding to 1 to 1.2 g of silver, per square meter.

This film is exposed under a colored diapositive to red, green and blue copying light. Thereafter the copy is developed according to the following instruction:
1. 6 minutes development in a bath which per liter of water contains 50 g of anhydrous sodium sulphite, 0.2 g of 1-phenyl-3-pyrazolidone, 6 g of hydroquinone, 35 g of anhydrous sodium carbonate, 4 g of potassium bromide and 0.3 g of benztriazole;
2. 5 minutes rinsing;
3. 6 minutes fixing in a solution of 200 g of crystalline sodium thiosulphate and 20 g of potassium metabisulphite in 1 liter of water;
4. 5 minutes soaking;
5. 3 to 12 minutes color-bleaching with a solution which per liter of water contains 50 to 80 g of potassium bromide, 40 to 80 g of thiourea, 35 to 80 g of 30 percent strength sulphuric acid and optionally 0.001 to 0.01 g of 2-amino-3-hydroxyphenazine;
6. 10 minutes soaking;
7. 5 minutes bleaching of residual silver with a solution of 60 g of crystalline copper sulphate, 80 g of potassium bromide and 15 ml of 30 percent strength hydrochloric acid per liter of water;
8. 5 minutes soaking;
9. 5 minutes fixing as specified under 3;
10. 5 minutes soaking.

A light-stable positive view image of the permanence required for documents is obtained.

Similar results are obtained on using the yellow dyestuff of formula XL instead of the dyestuff of formula X.

EXAMPLE 35

The same procedure as specified i Example 34 is followed, but instead of the dyestuff of formula (54) the purple dyestuff of formula XXXV of Table I is used.

A light-stable positive view image of the permanence required for documents is obtained.

EXAMPLE 36

The same procedure as given in Example 34 is followed, but instead of the dyestuff of formula (53) the bluish-green dyestuff of formula XLV or XLVI is used.

In both cases a light-stable positive view image of the permanence required for documents is obtained.

What we claim is:

1. Photographic, light-sensitive material which comprises on a support at least one silver halide containing layer and at least one layer containing an azo dyestuff of the formula

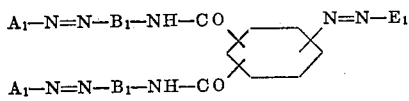

wherein $A_1$ represents a member selected from the group consisting of a benzene, naphthalene and pyrazolone radical, $B_1$ represents a member selected from the group consisting of a benzene, diphenyl, naphthalene and pyrazolone radical and $E_1$ represents a member selected from the group consisting of a benzene, naphthalene, or pyrazolone radical or an acetylamino radical derived from a coupling component, wherein at least the radicals $A_1$—N=N—$B_1$ each contain one to four acid groups which confer solubility in water or the copper complex compounds of these dyestuffs.

2. Photographic material according to claim 1 in which one layer contains an azo dyestuff of the formula

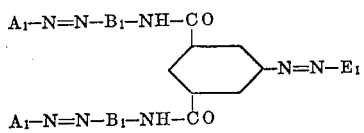

wherein $A_1$, $B_1$ and $E_1$ have the significance given in claim 1, or the copper complex compounds of these dyestuffs.

3. Photographic material according to claim 1 in which one layer contains an azo dyestuff of the formula

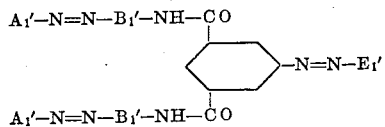

wherein $A'_1$ is benzene, naphthalene, phenylpyrazolone, substituted benzene, substituent naphthalene or substituted phenylpyrazolone, the substituents being halogen, alkyl having one to five carbon atoms, alkoxy having one to five carbon atoms, nitro, sulfonic acid, hydroxyl or a radical of the formula

in which U is hydrogen, alkyl having one to five carbon atoms, phenyl, alkylphenyl having one to five carbon atoms in the alkyl radical, hydroxyalkyl having one to five carbon atoms, cycloalkyl having five or six carbon atoms or acyl derived from an aliphatic carboxylic or sulfonic acid containing one to 10 carbon atoms, a carboxylic aromatic carboxylic or sulfonic acid containing one or two six-membered rings or a monocyclic heterocyclic carboxylic acid containing five or six ring members and N, S or O as hetero atoms; and U' is hydrogen, alkyl containing one to five carbon atoms or hydroxyalkyl containing one to five carbon atoms, $B'_1$ is benzene, naphthalene, diphenyl, substituted benzene, substituted naphthalene or substitutted diphenyl, the substituents being alkyl containing one to five carbon atoms, alkoxy containing one to five carbon atoms, hydroxyalkoxy containing one to five carbon atoms, alkoxyalkoxy containing twice one to five carbon atoms, carboxyalkoxy containing two to six carbon atoms, carboxyalkyl containing two to six carbon atoms, phenoxy, halogen, sulfonic acid, hydroxyl or acylamino, acyl being derived from the same acids as given for acyl in the definition of U; $E_1$ is a radical of the formula

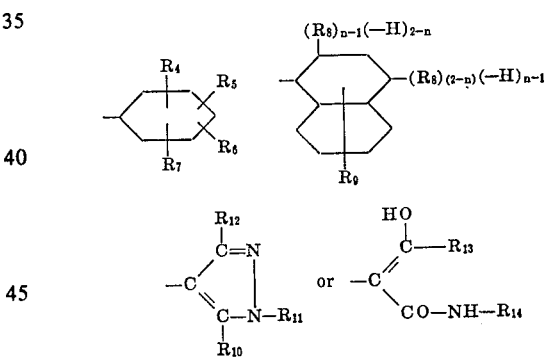

wherein $R_4$ represents hydroxyl, alkoxy having one to five carbon atoms or acylamino which are in the o-position or p-position to the azo group, $R_5$ represents hydrogen, alkyl or alkoxy having one to five carbon atoms, phenyl, phenoxy, carboxyl, carbalkoxy having one to five carbon atoms in the alkyl radical, carbamide, sulphonic acid or halogen, and $R_6$ and $R_7$ each represents hydrogen or methyl; wherein $R_8$ represents hydroxyl, alkoxy having one to five carbon atoms or acylamino, and $R_9$ represents hydrogen or sulphonic acid and $n$ is one or two; wherein $R_{10}$ represents hydroxyl or primary amino, $R_{11}$ represents phenyl, naphthyl, substituted phenyl or substituted naphthyl, the substituents being halogen, alkyl, alkoxy or carbalkoxy each having one to five carbon atoms, phenoxy, carboxy, carbamide, oxyacetic acid and/or sulphonic acid and $R_{12}$ represents hydrogen, alkyl having one to 17 carbon atoms, acylamino, phenyl naphthyl, carboxy or carbamide, alkyl-O-CO- or alkyl-O-alkylene-O-COhaving one to five carbon atoms in each of the alkyl or alkylene radicals or a urea radical and wherein $R_{13}$ represents alkyl having one to 17 carbon atoms, phenyl, phenyl substituted by alkyl or alkoxy which contain one to five carbon atoms or by halogen, pyridyl, furyl or thienyl, and $R_{14}$ represents phenyl, naphthyl, substituted phenyl or substituted naphthyl, the substituents being alkyl having one to five carbon atoms and/or halogen, alkoxy having one to five carbon atoms, carboxy, carbamide or carbalkoxy having one to five carbon atoms in the alkyl radical, acyl in the definition of $R_8$ and $R_{12}$ having the significance given in the definition of U; wherein at least the raicals $A'_1$—N=N—$B'_1$— each contain one to four acid groups which confer solubility in water; or the copper complex compounds of these dyestuffs, in which the dyestuff molecule contains one or two metal atoms in a complex bond between $A'_1$ and $B'_1$.

4. Photographic material according to claim 3 in which one layer contains an azo dyestuff of the formula

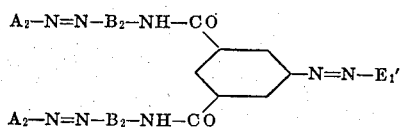

wherein $A_2$ represents benzene, napthalene, substituted benzene or substituted naphthalene, the substituents being halogen, alkyl containing one to five carbon atoms, alkoxy containing one to five carbon atoms, nitro, acylamino or one to three sulfonic acid groups, acyl having the significance given in the definition of U in claim 3; $B_2$ represents benzene, naphthalene, substituted benzene or substituted naphthalene, the substituents being at most two alkyl, alkoxy, hydroxyalkoxy, alkoxy-alkoxy, acylamino, carboxyalkyl, carboxyalkoxy or phenoxy each alkyl radical having one to five carbon atoms or substituted naphthalene, the substituents being alkoxy and at most two sulfonic acid groups and $E'_1$ has the significance indicated in claim 3.

5. Photographic material according to claim 3 in which one layer contains an azo dyestuff of the formula

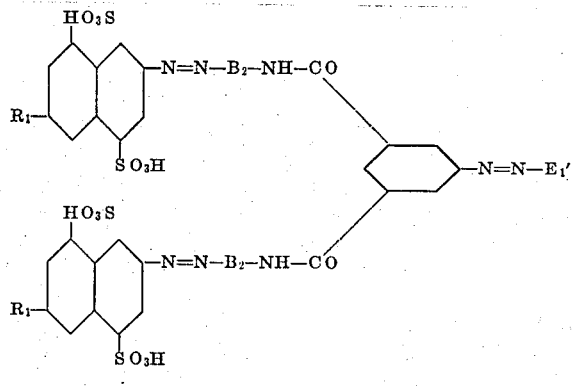

wherein $R_1$ is hydrogen, carbon or acylamino, acyl having the significance given in the definition of U in claim 3 an $E'_1$ and $B_2$ have the significance given in claim 3.

6. Photographic material according to claim 3 in which one layer contains an azo dyestuff of the formula wherein $R^0$ is acylamino, in which acyl has the significance given in the definition of U in claim 3 and $E'_1$ and $B_2$ has the meaning given in claim 3.

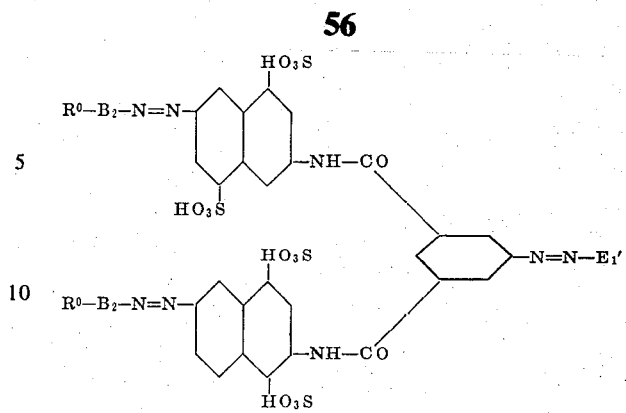

7. Photographic material according to claim 3 in which one layer contains an azo dyestuff of the formula

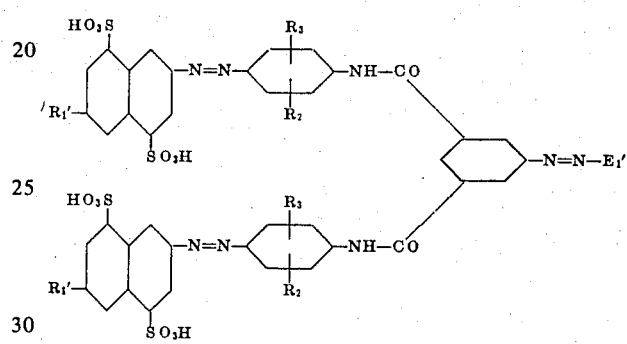

wherein $R'_1$ is hydrogen, nitro or acylamino of the formula $$D_1 — CO — NH —$$ or $$D_2 — SO_2 — NH —,$$

wherein $D_1$ is hydrogen, alkyl, hydroxyalkyl, alkoxy, alkoxy-alkyl, carboxyalkyl, sulfoalkyl, phenylalkyl, halogenalkyl, vinyl, phenyl, furyl, thienyl or pyridyl, primary amino, alkylamino, phenylamino or alkylphenyloxy, alkyl at each occurrence having one to five carbon atoms; $R_2$ is hydrogen, halogen, alkyl, alkoxy, hydroxyalkoxy or alkoxyalkoxy, each having one to five carbon atoms in the alkyl radical, phenoxy, oxyacetic or acylamino, with acyl representing the radical of an aliphatic carboxylic acid having one to five carbon atoms, benzoic acid, pyridine, furane or thiophene carboxylic acid, $R_3$ is hydrogen, alkyl or alkoxy having one to five carbon atoms or acylamino with acyl having the meaning given in the definition of $R_2$; and B' has the significance indicated in claim 3.

8. Photographic material according to claim 7 in which one layer contains an azo dyestuff of the formula

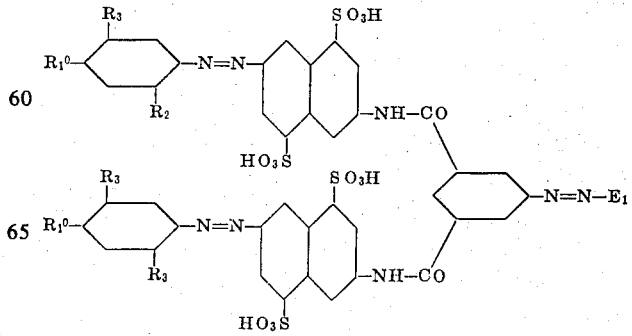

wherein $R_1^0$ is acylamino of the formula $$D_1 - CO - NH -$$ or $$D_2 - SO_2 - NH -$$

and in which $E'_1$, $D_1$, $D_2$, $R_2$ and $R_3$ have the significance indicated in claim 7.

9. Photographic material according to claim 1 in which one layer contains an azo dyestuff of the formula

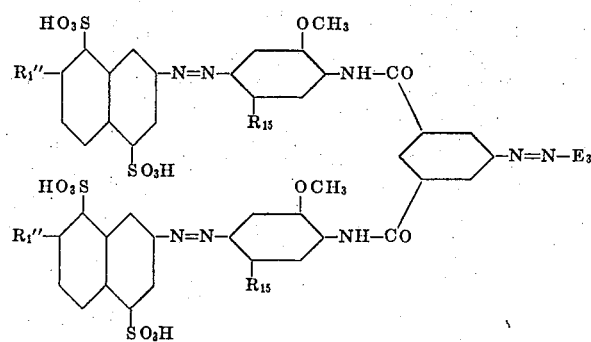

wherein $R''_1$ represents hydrogen, acetylamino, benzoylamino or tosylamino, $R_{15}$ represents chlorine, methyl, methoxy or acetylamino, $E_3$ represents 1-naphthol bonded in the four-position to the azo bridge, a radical of the formula

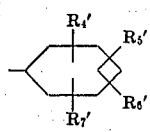

wherein $R'_4$ represents hydroxyl, methoxy, amino or acetylamino which is in the o-position or p-position to the azo bridge, $R'_5$ represents hydrogen, methyl or methoxy and $R'_6$ and $R'_7$ each represents hydrogen or a methyl; and $E_3$ also represents a radical of the formula

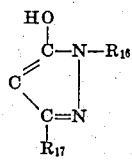

wherein $R_{16}$ represents phenyl or naphthyl and $R_{17}$ represents methyl, acetylamino, carbethoxy, carbethoxyethoxy or carbamide.

10. Photographic material according to claim 3 in which one layer contains an azo dyestuff of the formula

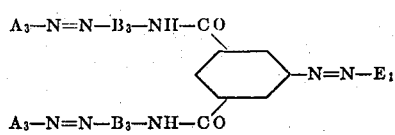

wherein $A_3$ represents benzene, phenylpyrazolone or naphtalene, which radical contains at least one member selected from the group consisting of a hydroxyl group and a radical of the formula

wherein $U'$ represents hydrogen, alkyl containing one to five carbon atoms, phenyl, alkylphenyl containing one to five carbon atoms, acyl, hydroxyalkyl containing one to five carbon atoms or cycloalkyl containing five or six carbon atoms, and $U'_2$ represents hydrogen, alkyl or hydroxyalkyl each containing one to five carbon atoms; acyl having the significance given in the definition of U in claim 3, $B_3$ represents benzene, naphthalene or diphenyl, substituted benzene, substituted naphthalene or substituted diphenyl, the substituents being halogen, alkyl or alkoxy having one to five carbon atoms; with the radicals $A_3$ and $B_3$ together containing one to three sulfonic acid groups and $E'_1$ has the significance indicated in claim 3; and the copper complex compounds of these dyestuffs, in which the dyestuff molecule contains one or two metal atoms in a complex bond between $A_3$ and $B_3$.

11. Photographic material according to claim 3 in which one layer contains an azo dyestuff of the formula

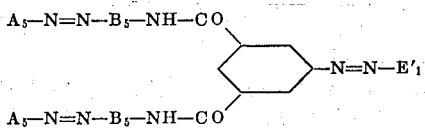

wherein $A_5$ represents naphthalene which contains at most two sulfonic acid groups, at least one hydroxyl group and a radical of the formula $$- O - U_4$$ or

wherein $U_4$ represents hydrogen, alkyl containing one to five carbon atoms or phenyl methoxy, and $U_5$ represents hydrogen, alkyl containing one to five carbon atoms, hydroxyalkyl containing one to five carbon atoms, phenyl or acyl, acyl having the significance given in the definition of U in claim 3, $B_5$ is benzene containing at least one member selected from the group consisting of alkyl having one to five carbon atoms, alkoxy having one to five carbon atoms and acylamino, acyl having the above meaning, or naphthalene containing at most two sulfonic acid radicals or hydroxyl, and $E'_1$ has the significance indicated in claim 3; or the copper complex compounds of these dyestuffs in which the dyestuff molecule contains one or two metal atoms in a complex bond between $A_5$ and $B_5$.

12. Photographic material according to claim 1 in which one layer contains an azo dyestuff of the formula

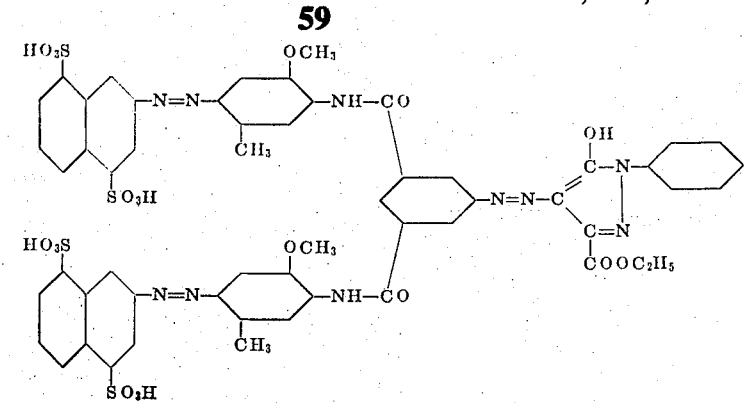

13. Photographic material according to claim 1 in which one layer contains an azo dyestuff of the formula

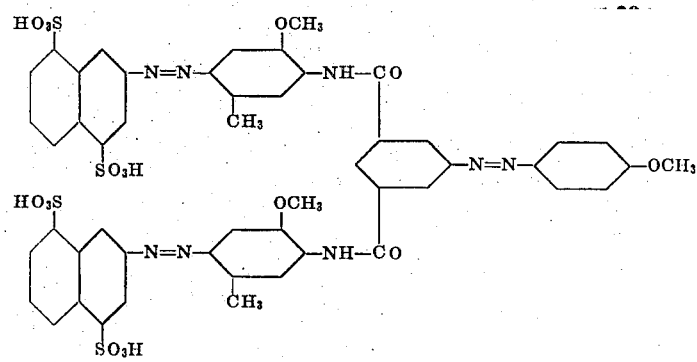

14. Photographic material according to claim 1 in which one layer contains an azo dyestuff of the formula

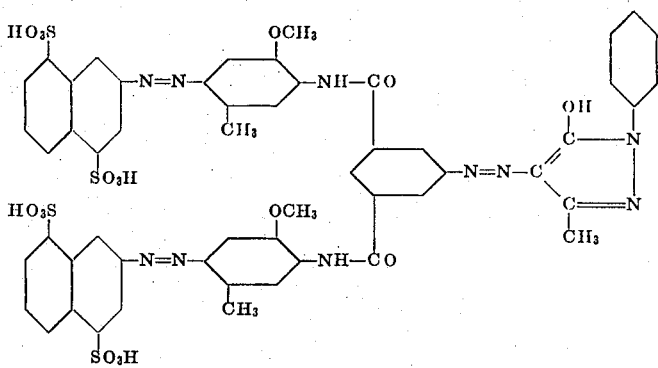

15. Photographic material according to claim 1 in which one layer contains an azo dyestuff of the formula

16. Photographic material according to claim 1 in which one layer contains an azo dyestuff of the formula

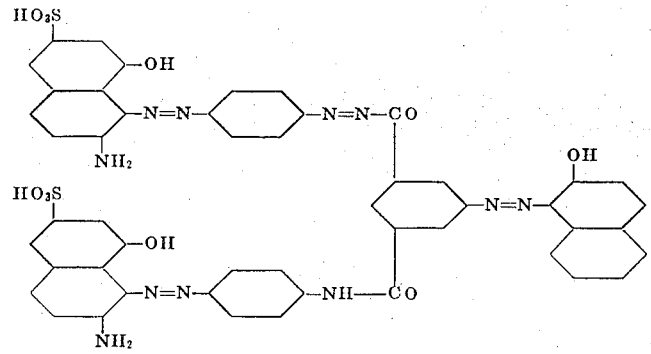

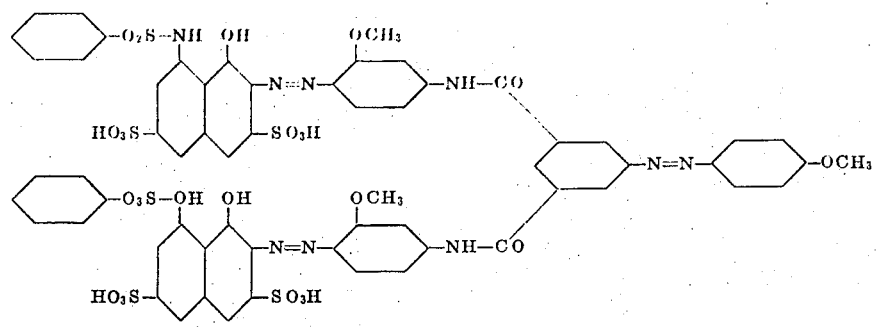
17. Photographic material according to claim 1 in which one layer contains an azo dyestuff of the formula
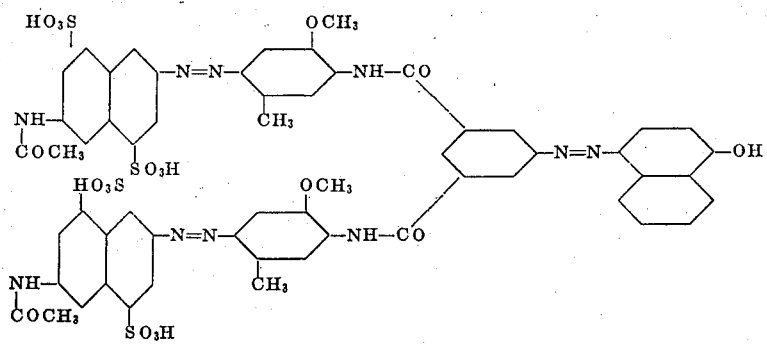
* * * * *